INVENTOR.
JAMES W. DODSWORTH
BY Elmer W. Edwards
AGENT

June 4, 1963

J. W. DODSWORTH 3,092,312

VALUE TRANSFER CONTROL FOR TOTALIZER

Filed Oct. 9, 1961

INVENTOR.
JAMES W. DODSWORTH
BY Elmer W. Edwards
AGENT

June 4, 1963  J. W. DODSWORTH  3,092,312
VALUE TRANSFER CONTROL FOR TOTALIZER
Filed Oct. 9, 1961  15 Sheets-Sheet 3

INVENTOR.
JAMES W. DODSWORTH
BY Elmer W. Edwards
AGENT

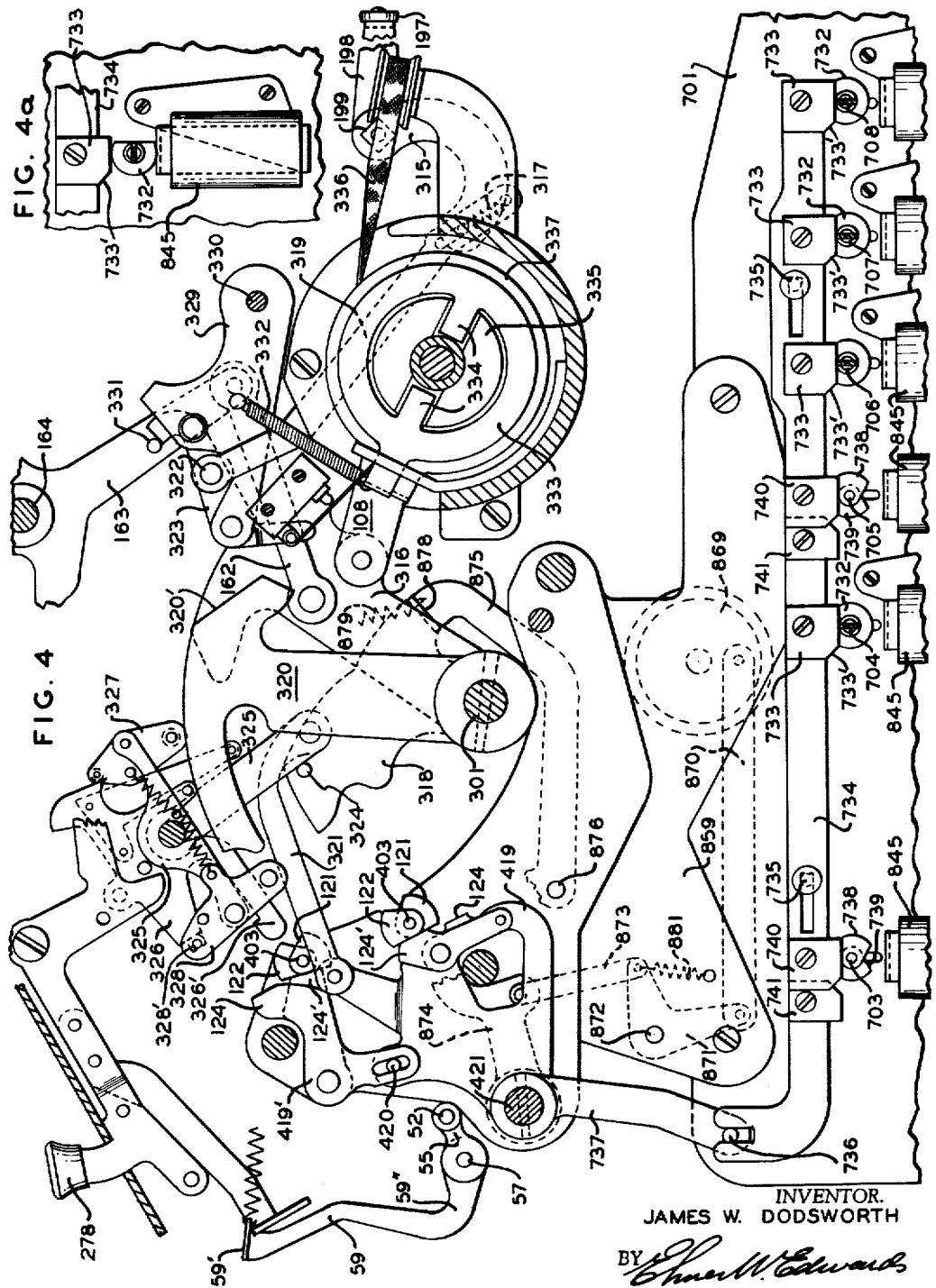

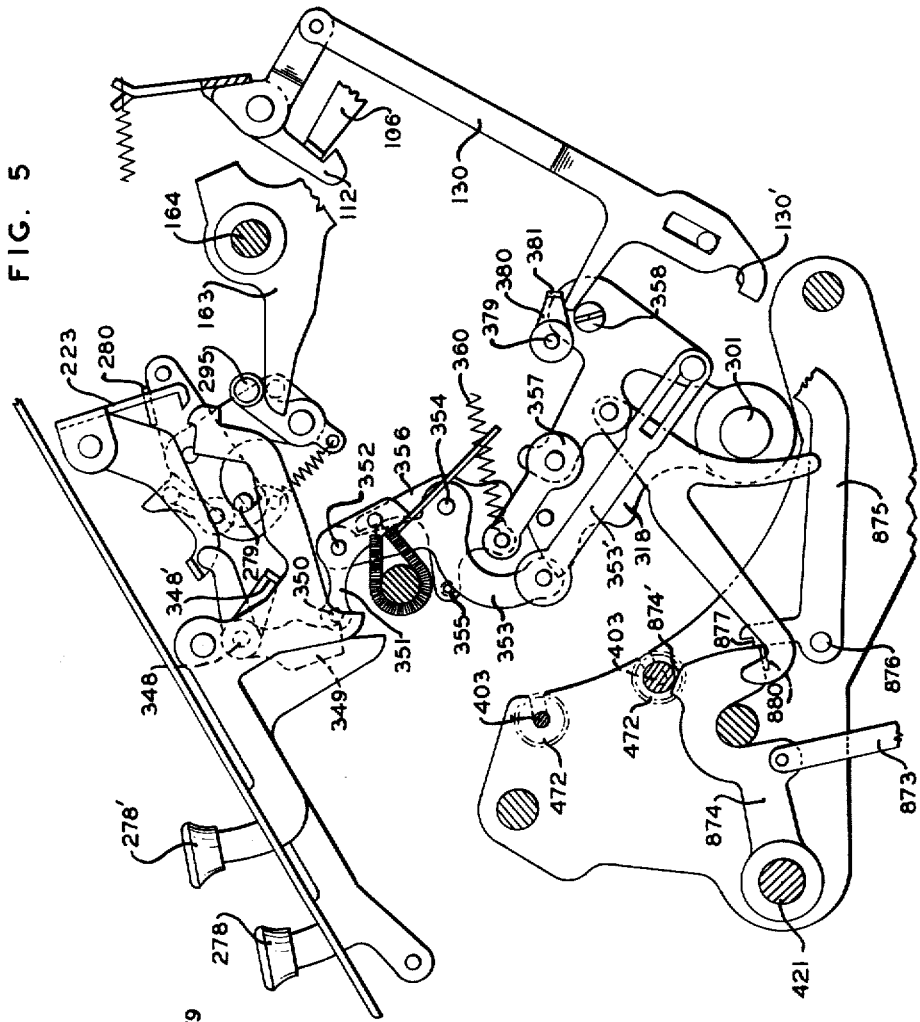
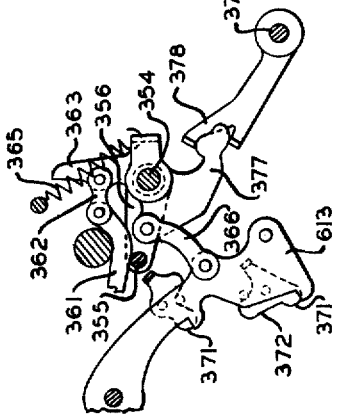

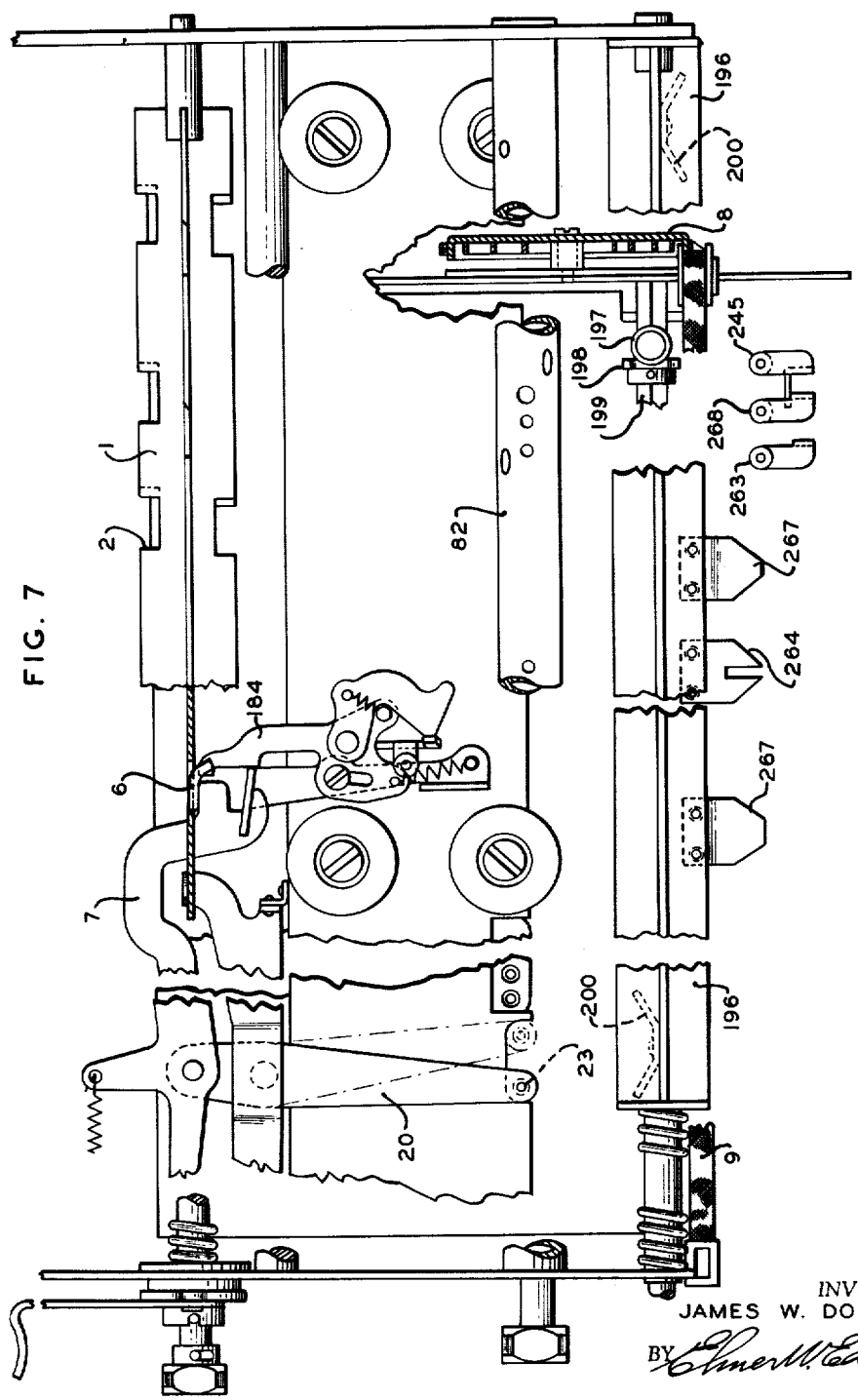

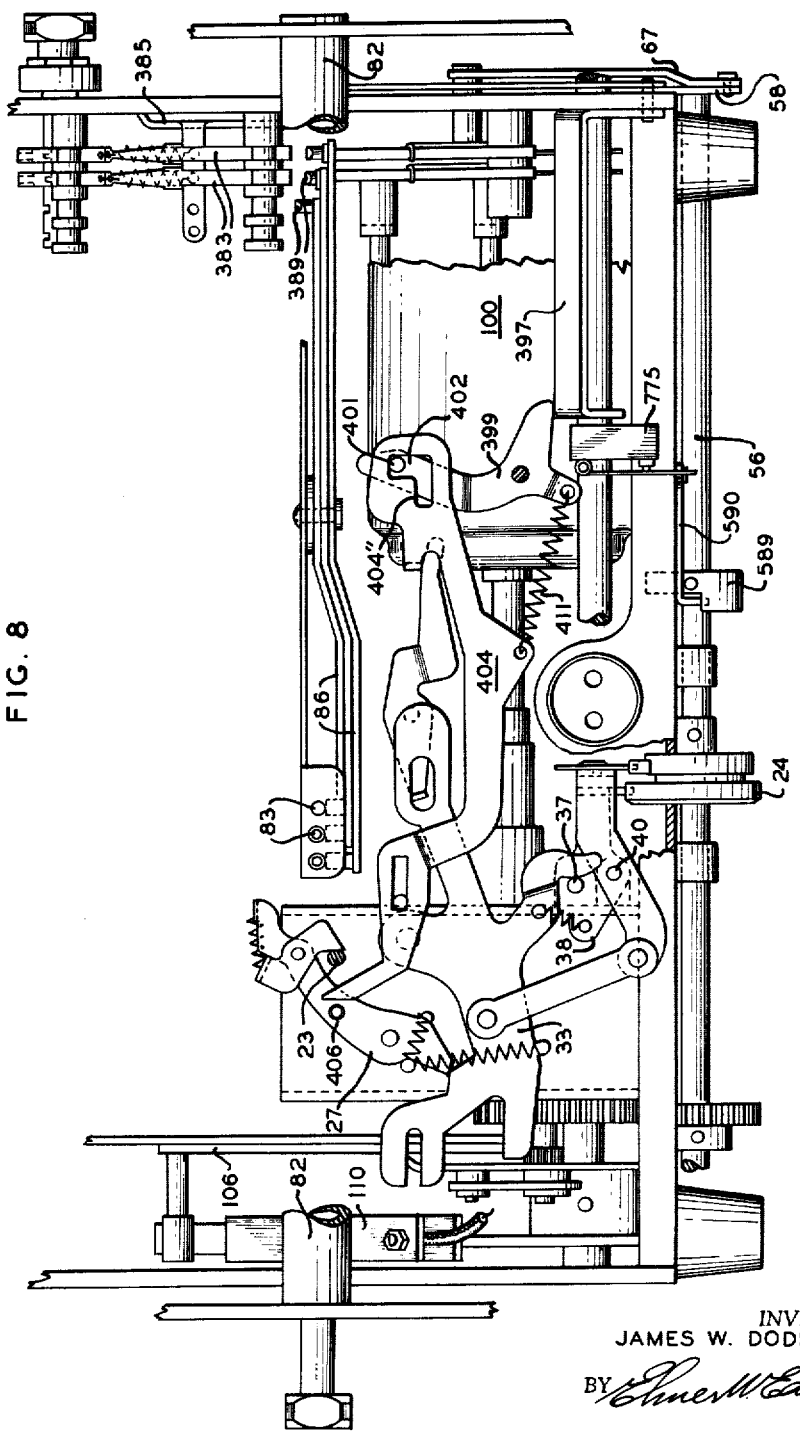

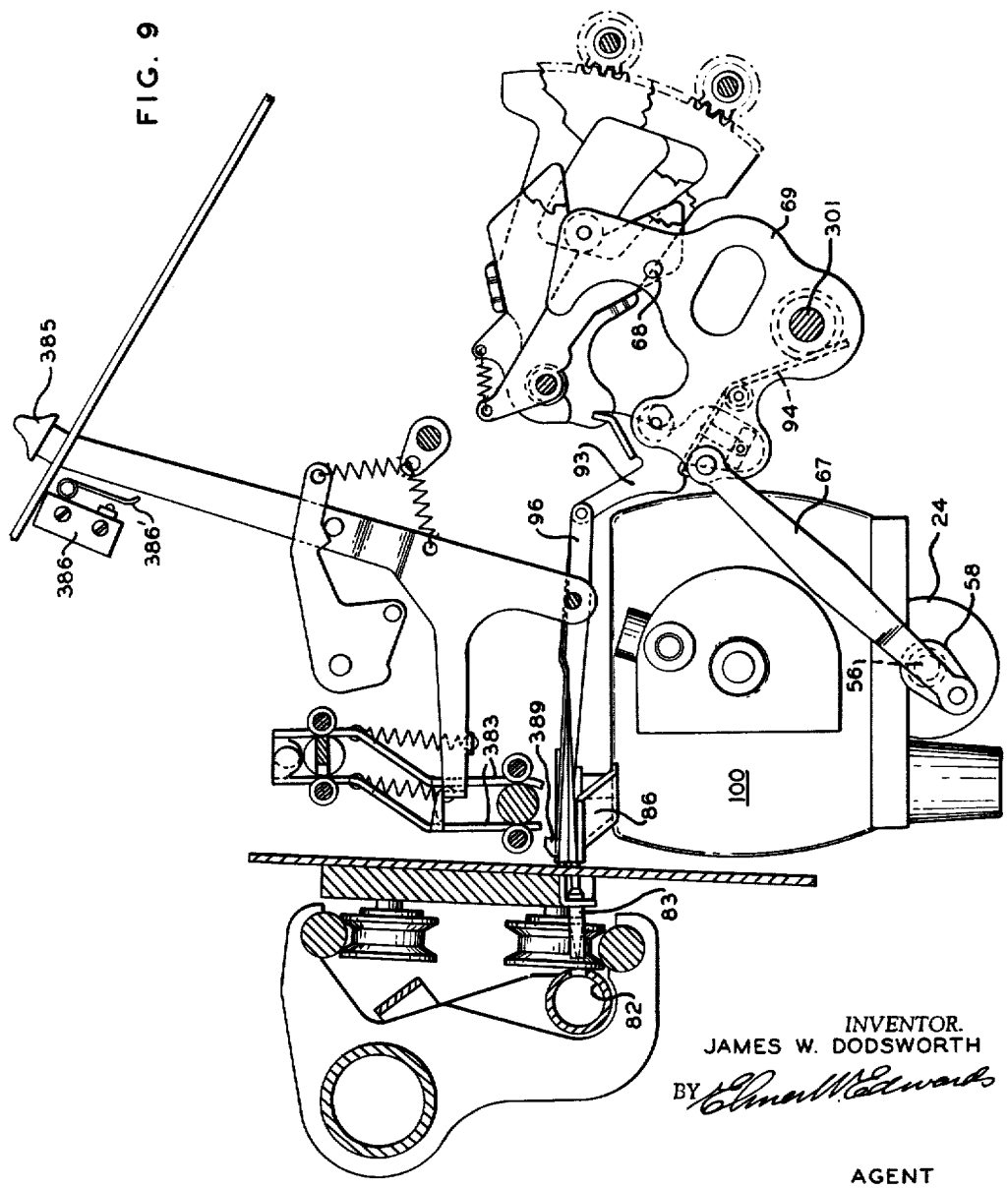

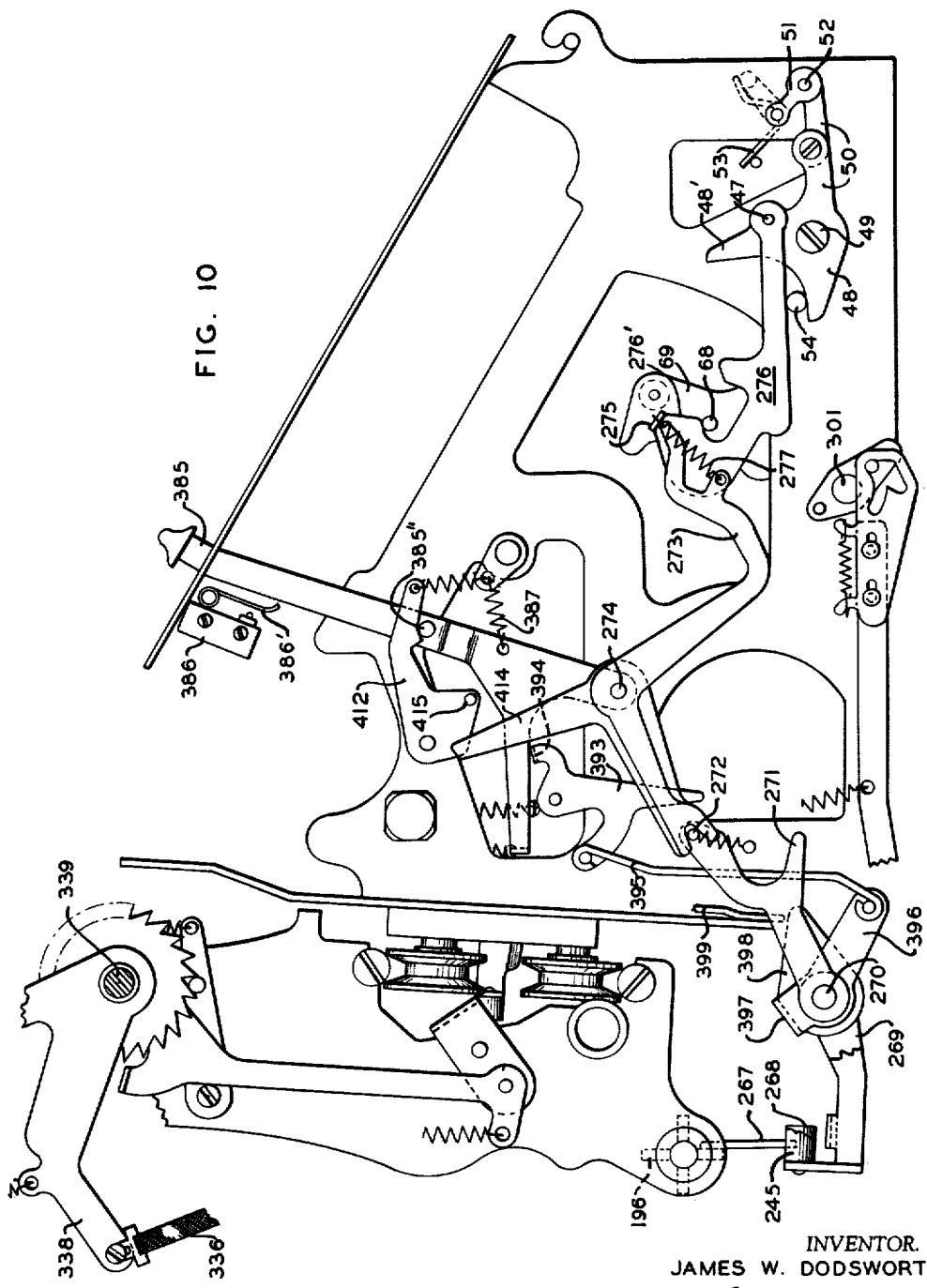

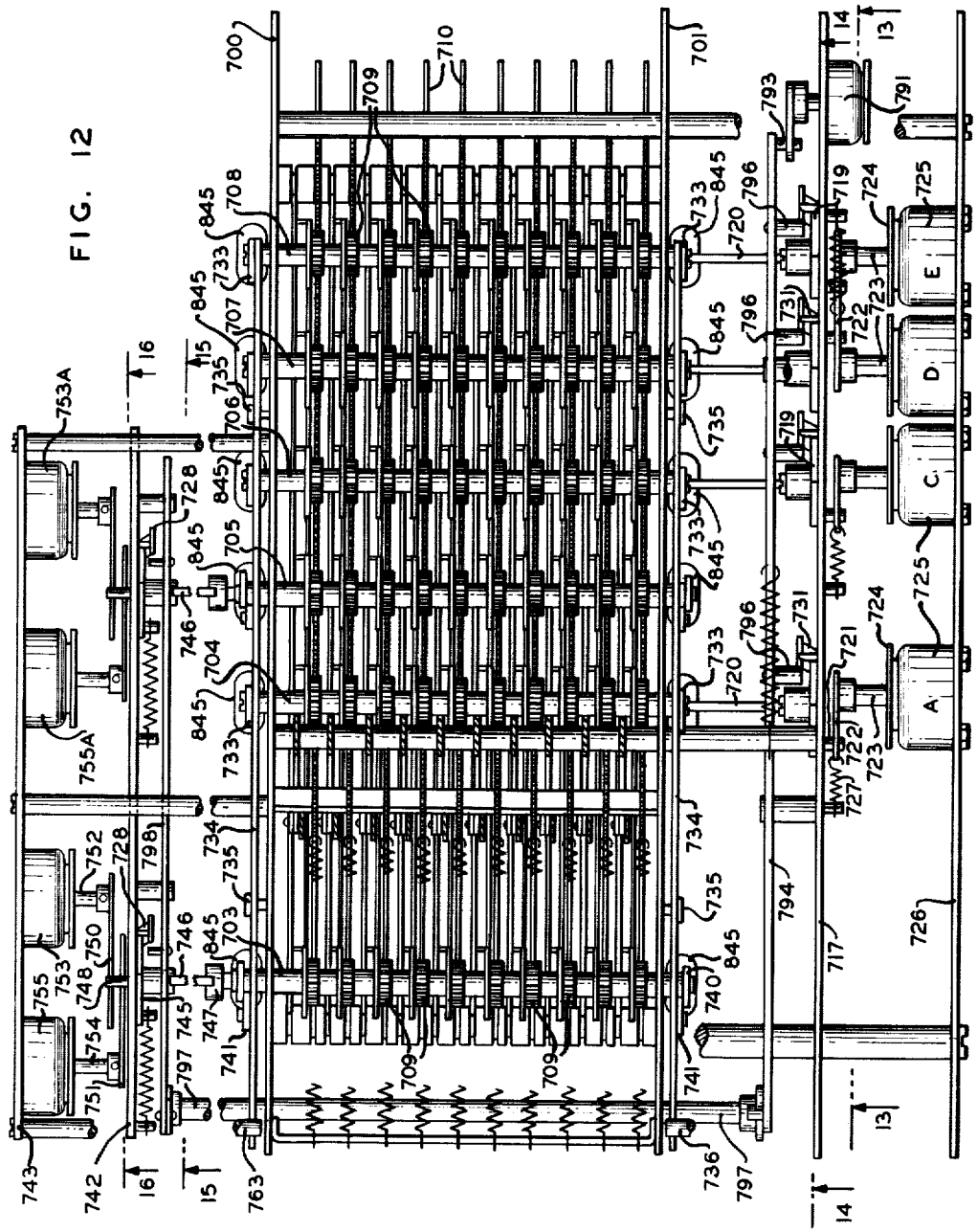

June 4, 1963  J. W. DODSWORTH  3,092,312
VALUE TRANSFER CONTROL FOR TOTALIZER
Filed Oct. 9, 1961  15 Sheets-Sheet 13
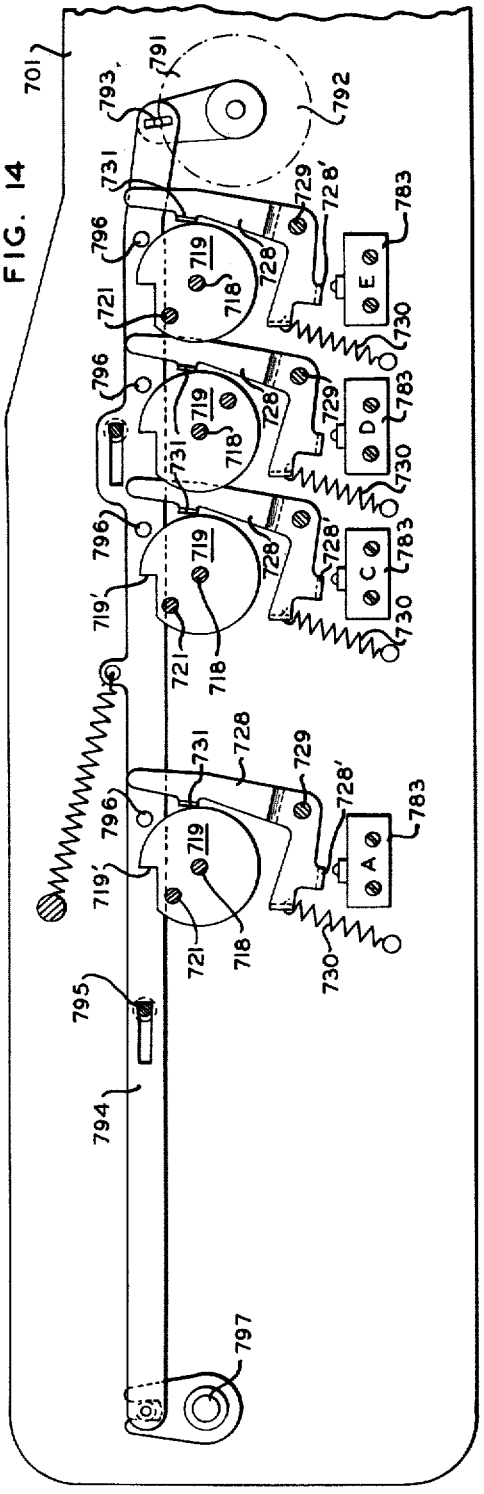
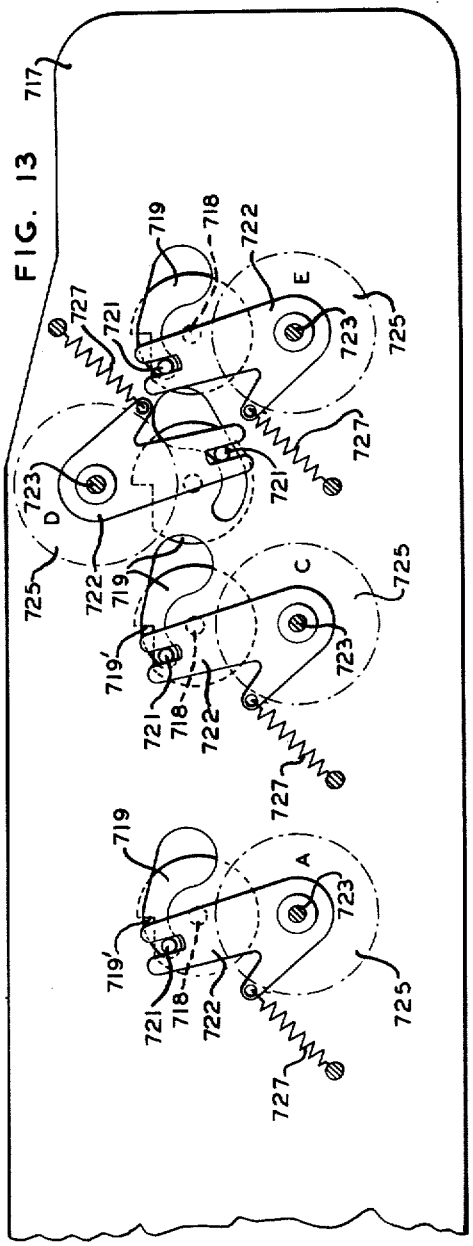
INVENTOR.
JAMES W. DODSWORTH
BY
AGENT June 4, 1963    J. W. DODSWORTH    3,092,312
VALUE TRANSFER CONTROL FOR TOTALIZER
Filed Oct. 9, 1961    15 Sheets-Sheet 15

INVENTOR.
JAMES W. DODSWORTH
BY
AGENT

United States Patent Office 3,092,312
Patented June 4, 1963

3,092,312
VALUE TRANSFER CONTROL FOR TOTALIZER
James W. Dodsworth, Mount Tabor, N.J., assignor to Monroe Calculating Machine Company, Orange, N.J., a corporation of Delaware
Filed Oct. 9, 1961, Ser. No. 143,717
25 Claims. (Cl. 235—60.2)

This invention relates in general to power-operated business machines of the type adapted for bookkeeping operations wherein debit and credit transactions are printed on one or more record forms inserted in a cross-tabulating and vertical feed paper carriage.

More particularly, the present invention pertains to control devices for effecting selection and operations of selective ones of a plurality of amount registers; being an improvement on the devices set forth in my copending applications No. 860,553 and No. 860,554 filed December 18, 1959, said applications being a division of my application No. 760,501 filed on September 16, 1959, now Patents 3,021,056, and 3,021,054 and 3,022,940, respectively.

The devices of said applications provide inter alia, for a plurality of value registers which are selected for operation by related electromagnetic means having control circuits programmed to be energized selectively in accordance with the particular columnar positions of the record carriage. One of said magnetically controlled registers has relation to a crossfooter type operation while the other registers are limited to vertical total type operations only. The well-known characteristic of the two types is that for crossfooter operations a register must be capable of a subtractive operation control as well as for additive control type operations, while for vertical total operations a register need only be adapted for an additive control type of operation. Thus, as fully described in said copending applications, each of the vertical total registers has secured upon each end of its shaft a single cam element operable by a related rotary type solenoid for controlling additive type operations. For the crossfooter register two control cams are fast upon each end of the register shaft and require two rotary type solenoids adapted for selective operation whereby to effect a partial rotation of the register shaft in one direction or the other and thereby determine either an additive or a subtractive setting of the said control cams.

In addition to the electromagnetically controlled registers a pair of crossfooter registers are provided, each of which is adapted for control by well-known mechanical program devices, as in the manner fully set forth in the U.S. Patent 1,946,572 of reference.

Totals are adapted to be transferred from one crossfooter register to any other crossfooter register in the well-known manner fully set forth in U.S. Patent 2,070,785 issued February 16, 1937 to L. P. Crosman.

For the known art of my earlier referred copending applications the control of a transfer of amounts (either negative or positive) from one register to another is limited to total taking operations only and then only in relation to the crossfooter type registers. As will become more apparent as the present description proceeds the devices of the present invention provides not only for a transfer of totals to the crossfooter registers but also to the vertical total registers as well. Also, for the first time subtotals are adapted to be transferred selectively to and from both the crossfooter and vertical total type registers.

One object of the present invention therefore provides for improved register control means adapted to transfer amounts from one register to another register.

Another object provides register control means for transferring amounts from one register to another register employing adding type controls only.

A further object provides control means whereby totals are transferred from any selected register to any vertical total register.

A still further object provides means for transferring subtotal amounts from any selected register to any selected ones of the vertical total registers.

As a still further object the invention provides special means whereby a subtotal may be transferred from any selected register to a crossfooter type of register.

Another object of the invention is the provision of means for transferring a complemental total in a first cycle of machine operation employing plural cycle true negative total means and for thereafter disabling any transfer register during the subsequent machine cycles in effecting such true negative total operations of the totalized register.

Novel means for effecting a selective control of the registers in accordance with selected columnar positions of a record carriage in effecting a program series of operations are also provided.

With the above and other objects in view the nature of which will appear as the description proceeds, the invention resides in the novel construction, combination and arrangement of parts as hereinafter described with reference to the accompanying drawings and more particularly defined by the appended claims.

FIGS. 1–1A combined, illustrate diagrammatically a plan view of a machine to which the invention has been applied and a wiring diagram of the circuit means related to the present invention.

FIG. 4 is a right side elevation showing portions of the register control means and of the automatic carriage return means.

FIG. 4A is a detail view of one of the register holding magnets.

FIGS. 5, 6 are detail right side elevations showing portions of the total taking means.

FIG. 7 is a rear elevation showing the carriage tabulating means.

FIG. 8 is a rear elevation showing the register selection clutch for the mechanically operated program control means.

FIG. 9. is a left side elevation of said program means and showing a means for modifying an operation thereof under control of the vertical total lever.

FIG. 10 is a left side elevation of certain parts under control of the vertical total lever.

Figure 2:
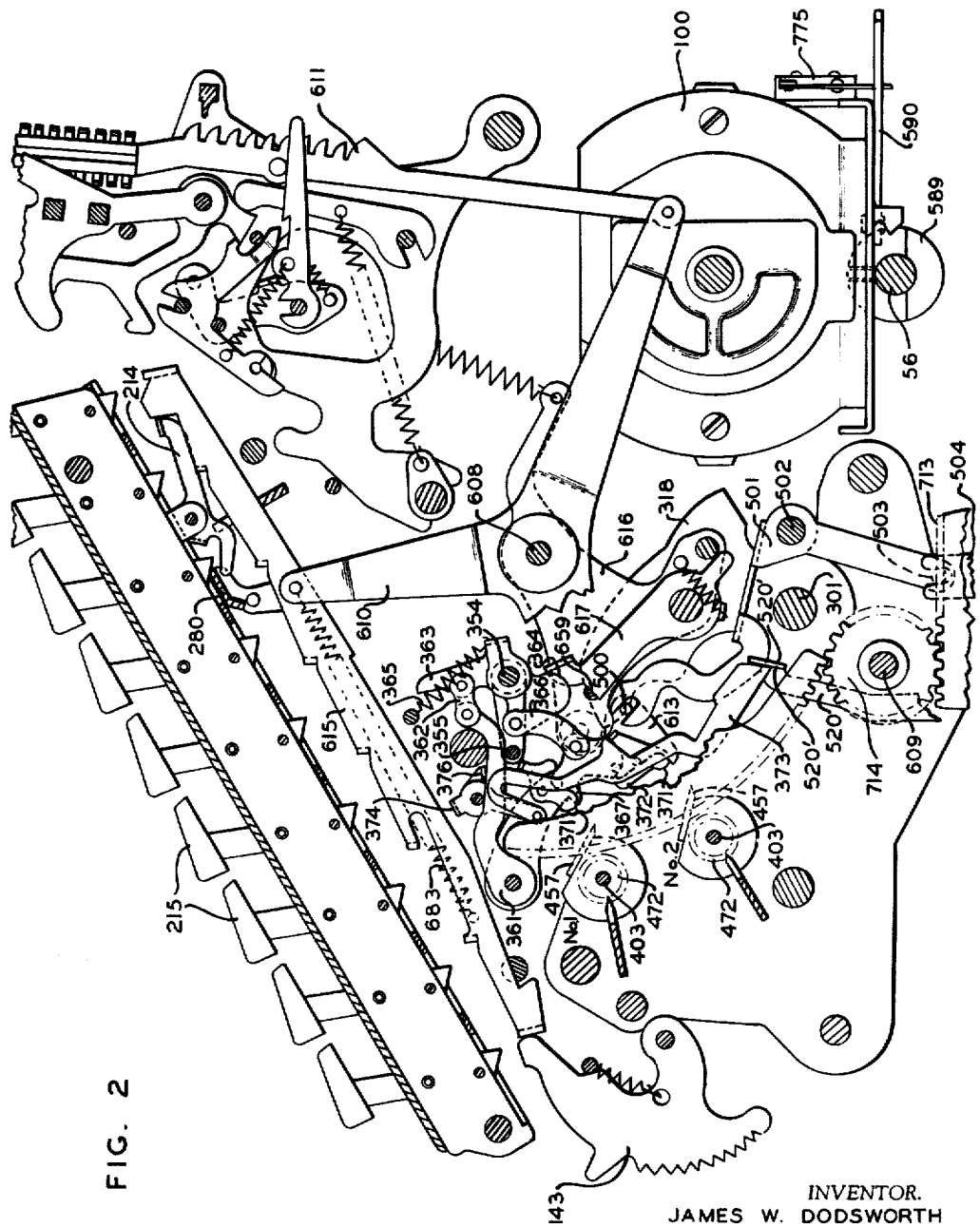
FIG. 2 is a right side cross-section viewed substantially through the center of the machine to which the invention is applied, showing the keyboard, register actuating, printing and totalizing devices.
Figure 11:
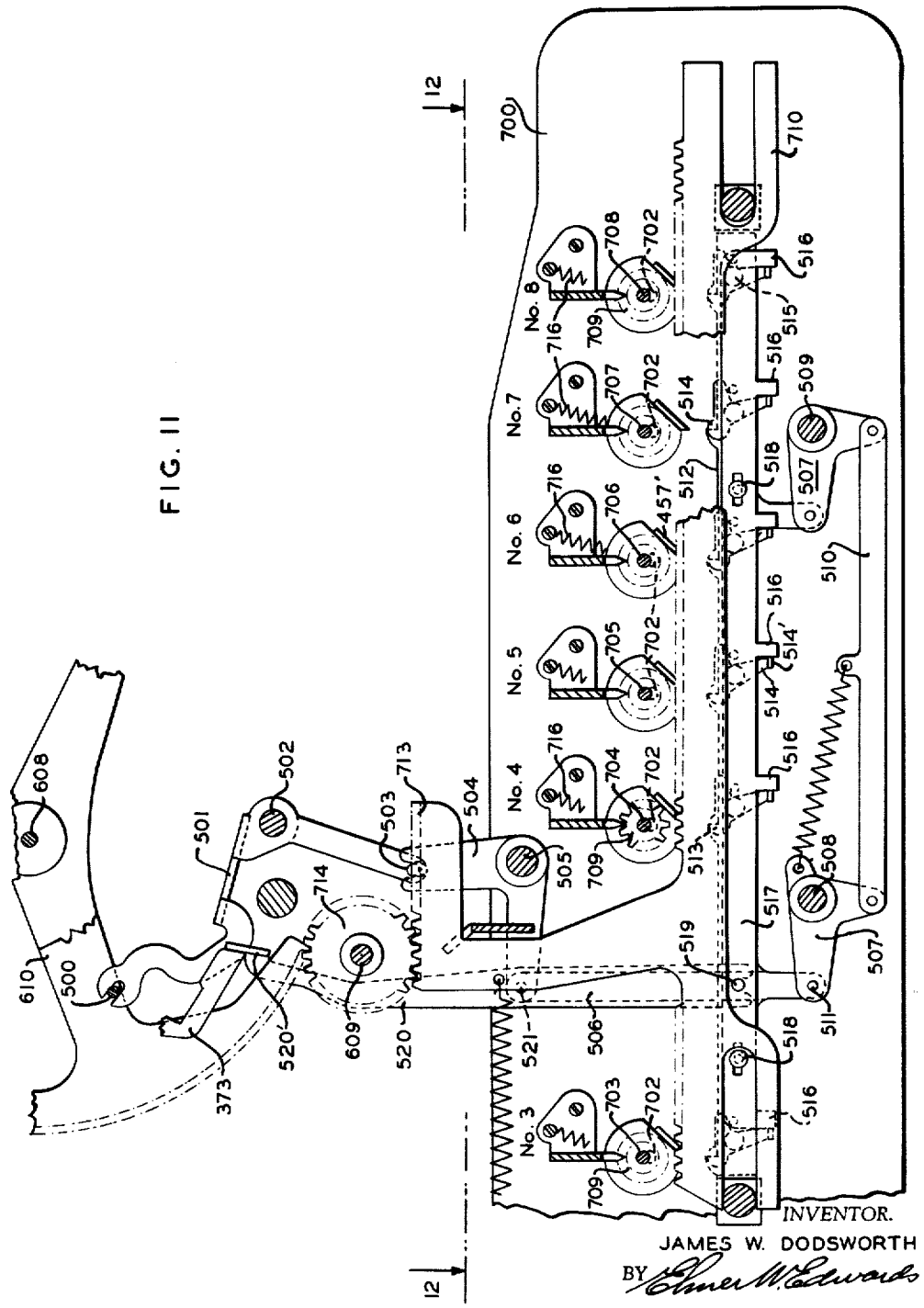

FIG. 11 is a right side cross-section of the lower register unit, viewed substantially through the center of the machine and having parts connecting with certain of the parts shown in FIG. 2.

FIG. 12 is a plan view in cross-section taken substantially on line 12—12 of FIG. 11.

FIG. 13 is a cross-sectional elevation take on line 13—13 of FIG. 12 and showing the electromagnetic means for operating the register control discs whereby to set a register to active condition.

FIG. 14 is a cross-sectional elevation take on line 14—14 of FIG. 12 and showing latches for locking the related discs and registers in their active set position.

Figure 15:
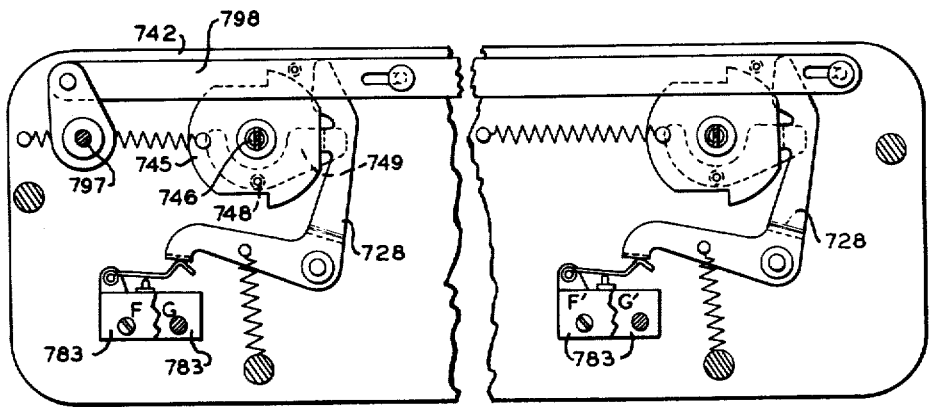

FIG. 15 is a detail cross-sectional elevation taken on line 15—15 of FIG. 12 and showing the electromagnetic add and substaract control devices related to the No. 3 and No. 5 registers.

Figure 16:
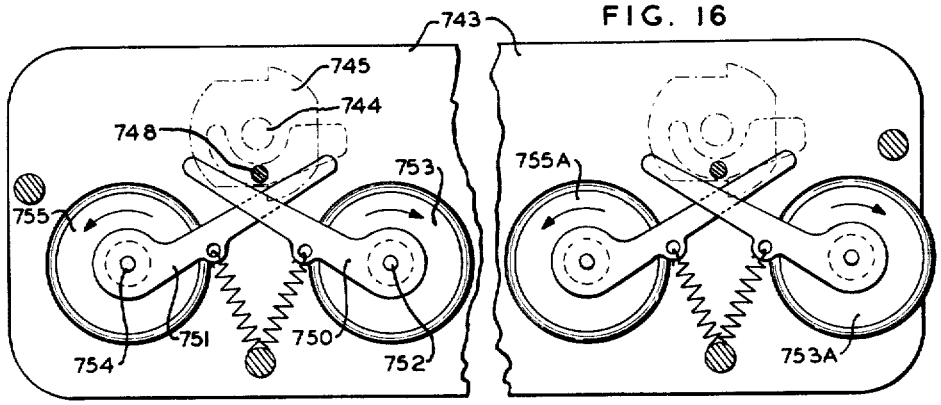

FIG. 16 is a similar view taken on line 16—16 of FIG. 12.

Figure 17:
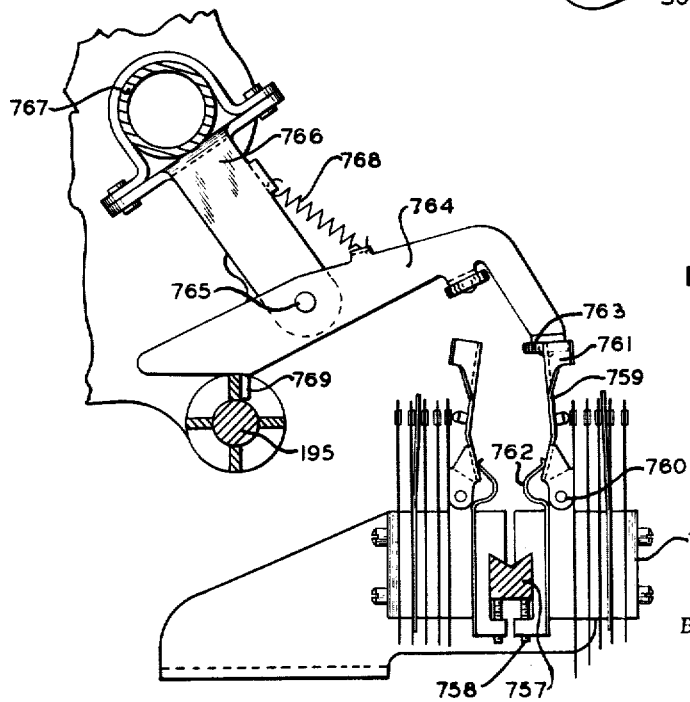

FIG. 17 is a fragmentary left side cross-section of the record carriage and showing the program switches related to the electromagnetic control devices for the registers.

Figure 18:
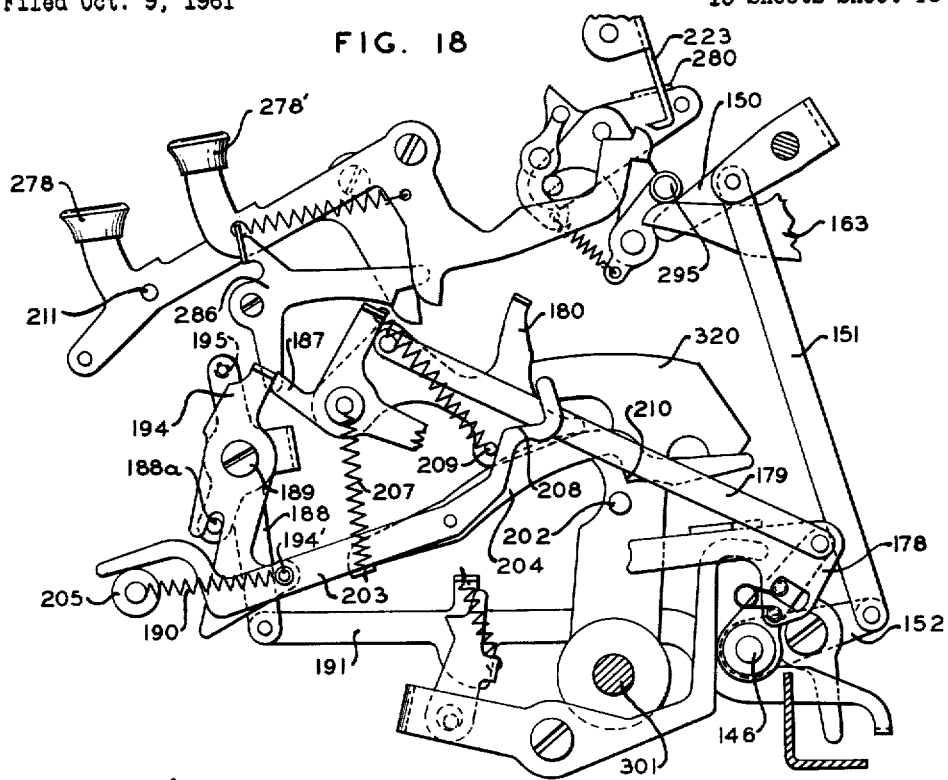

FIG. 18 is a right side elevation of the total and subtotal keys and associated control devices related to an overdraft operation.

Figure 19:
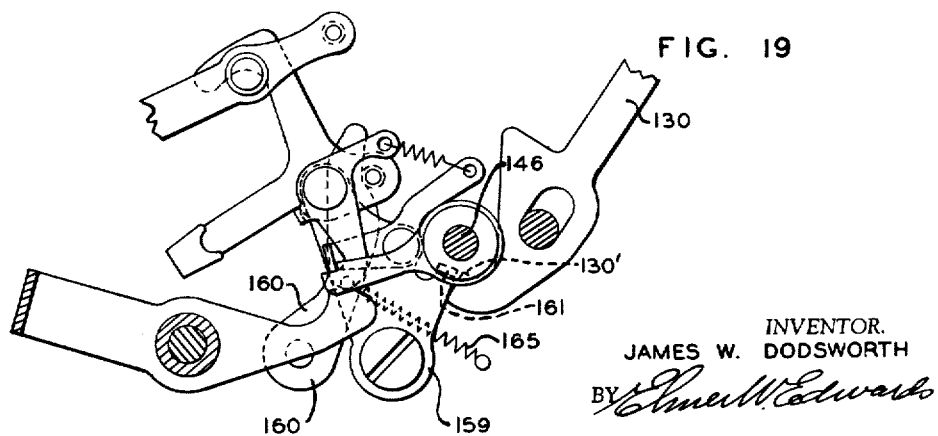

FIG. 19 is a detail view of control devices adapted to determine plural cycles of machine operation for negative totals.

General Description

The machine to which the present invention has been applied is of well-known type and in general is similar to that illustrated in U.S. Patent 1,915,296 issued June 27, 1933 to Loring P. Crosman and the earlier referred to U.S. 1,946,572 issued February 13, 1934 to the same inventor, and as modified in accordance with the disclosure of U.S. Patent 2,756,926 issued July 31, 1956 to J. W. Dodsworth.

In basic structure the machine proper is of the add-subtract lister type having two crossfooter totalizers or registers of ten accumulator wheels each, automatic credit balance mechanism, automatic true positive or negative total taking mechanism, and printing mechanism for printing entries and totals.

The machine is equipped with both automatic crosstabulating and power return mechanisms for the platen carriage, and with mechanical means automatically controlled from the moving carriage to variously effect register selection, cause an amount set up on the keyboard to be entered therein positively or negatively, and to take automatic subtotals and totals all at selected positions of the movable carriage.

For each denominational order the machine is provided with a three armed differential actuator lever numbered 610 (FIG. 2) loosely mounted on a shaft 608. The forward arm of each lever 610 terminates in a segmental registering rack; the rearward arm has a lister type bar 611 pivoted thereto, and the upper arm has pivoted connection with a differential stop bar 615 cooperating with a bank of digit keys 215 to limit the movement of the lever 610.

The digit keys are depressible to represent a value and when depressed are latched in position with the bottom of their stems lying in the path of movement of the related stop lugs of the bars 615, and allow such bars to advance a distance proportionate to the value of the depressed key, upon operation of the machine. Depression of a digit key will also remove a column latch 214 from the path of movement of its related bar 615, which latches prevent movement of a stop bar 615 and lever 610 in any column in which no key is depressed.

A rock shaft 301 is provided with cam means 318 for governing the movement of a spring tensioned rocker frame 616, carrying a series of dogs 617, normally engaged by stud 659 of the lever 610. As shaft 301 is rotated forwardly (counterclockwise in FIG. 2) frame 616 will be rocked about shaft 608, and any of the levers 610 which have been released by depression of digit keys 215 will be allowed to rotate, under influence of their springs 683, until they are stopped by the lugs of bar 615, contacting with the stems of the keys. Upon rearward (return) rotation of shaft 301, the dogs 617 will return the operated levers 610 to normal position. This excursion of lever 610 serves to register amounts set in the keyboard upon one or more accumulators and to set up a similar amount on the printing line of the type bars.

Shaft 301 is oscillated by an electric motor 100, connected through suitable gearing and clutch means 103—104 (FIG. 3), with a crank arm 105 connected by a rod 108 to an arm 316, fast upon shaft 301, so that as crank arm 105 is rotated, shaft 301 will be oscillated.

Motor operation is normally controlled by motor bars or keys through a clutch lever 106 which is provided with a roller adapted to close contact switch 110 in the motor circuit after lever 106 is moved out of restraining engagement with the spring operated clutch. A spring 111 tends to pull lever 106 away from the clutch, the lever being normally held in clutch engaging position by means of a latch 112. Latch 112 is controlled by a trigger 113, lying in the path of movement of a lever arm 114' connected with a motor key 114. Upon depression of key 114 trigger 113 is rocked clockwise to release latch 112 and clutch lever 106 will be pulled out of engagement with the clutch to start the machine in operation.

Upon release of key 114, latch 112 will return under spring action into latching position and, toward the end of the cycle of operation, and arm 115 connected with the crank member 105 will contact a tooth 116 of the clutch lever 106 and will force said lever back into latching position, breaking the electric circuit and bringing the end of lever 106 into the path of movement of the rotating clutch pawl 103 to terminate the cycle.

Add-Subtract Control for No. 1 and No. 2 Registers

Means are provided as fully disclosed in U.S. Patent 1,946,572 of reference for selectively throwing the pinions 472 (FIG. 2) of the accumulators No. 1 and No. 2 into mesh with segments 610 either during the forward stroke movement of said segments, to effect subtractive registration on the accumulators or during the return stroke movement of the segments to effect additive registration thereon. This means comprises a series of cams 121—122 (FIG. 4) on the register shafts 403 and a series of cooperating cams 124—124' connected with rocker plates 419—419', fast upon transverse shaft 421, and so arranged that when the high points of the cams upon the shaft 403 register with the high points on the cams connected with the plates 419—419', the register pinions will be moved into mesh with the segments 610, against the tension of suitable springs, the register shafts being guided in their movements into and out of mesh with the segments by engagement with the walls of suitable slotted recesses in a fixed frame plate. The accumulators No. 1 and No. 2 are each capable of an additive or a subtractive registration or may be disabled by adjustment to nonadd condition, by the appropriate location of the cams carried by the shafts 403, and whereby said registers are adapted to the purpose of accumulating values which are entered into other accumulators during a crossfooter posting series or line of entries, such as will hereinafter be described.

In order that the No. 1 and No. 2 accumulators may be set for addition or subtraction, the two cams 121 and 122 project from the shaft 403 in different angular directions, so that a counterclockwise rotation of either shaft 403 (FIG. 4) will move the related cam 122 into registering position with the cam 124, while cam 121 remains out of registering position with cam 124 and a further counterclockwise rotation of the shaft acts to move both the cams on the shaft so that cam 122 is now moved out of registering position and cam 121 is moved into registering position with their cooperating cams.

Plates 419—419' are interconnected by pin and slot means 420 for movement in opposite directions and are rocked to change the position of the cams 124—124' relative to their cooperating cams 121—122 at the end of the forward stroke of the segments 610 and may also be rocked at the beginning of the registering operation, plate 419 having link connection 321 with a rocker 325 for this purpose. Rocker 325 is controlled by two cam arms 316 and 320 secured upon rock shaft 301, the arm 316 being adapted to engage a cam follower 327 pivoted upon the rear end of rocker 325 and arm 320 adapted to engage a similar cam follower 328 pivoted upon the forward end of the rocker. Said rocker devices are fully disclosed in the patents of reference and it is sufficient to say that in a normal condition of operation thereof a plate 326 is so positioned as to prevent counterclockwise pivotal movement of the rear cam follower 327 and to prevent clockwise pivotal movement of the forward cam follower 328, this plate being adapted to rock with rocker 325. As viewed in FIG. 4, at the beginning of a registering operation cam arm 320, contacting the forward cam follower 328 effects clockwise operation of the rocker 325 thereby rocking the plates 419—419' to bring cams 124 into registering position with the related cams 122 while displacing cams 124' from registering position with the cams 121. As shown however cams 121—122 for both registers are set for a nonadd operation and will remain out of engagement with the actuator racks 610. Suitable means programmed for operation under control of the record carriage are provided for effecting a rotation of shafts 403 in a given direction to selectively determine a register selection and the character of operation to be performed thereon, as will hereinafter be described.

*Register Totalizing Operation*

The registers are the well-known crawl carry type wherein a total standing in any one of the registers may be cleared therefrom and printed upon the record sheet by engaging the pinions 472 (FIG. 2) of the register with the segments 610 and thereafter successively releasing the differential stop bars 615 to allow the segments 610 to rotate the accumulator wheels subtractively until suitable zero stops 457 thereon engage cooperating stop hooks 367, which have been brought into their paths of movement in the well-known manner set forth in U.S. Patent No. 2,261,341 issued November 4, 1941, to Loring P. Crosman.

As more fully set forth in the patents of reference, a depression of either a total key 278 or a subtotal key 278' (FIG. 5) will act to release the column latches 214 (FIG. 2) upon engagement of a rearward arm of said levers with a stud 279 fixed in the arm of a releasing bail 280 extending transversely of the latches and serving to move them out of engagement with the stop bars 615, thereby freeing the actuator segments from the control of said column latches.

To initiate a successive zeroizing of the numeral wheels key 278 or 278' when depressed engages a cranked extension 348' of a shaft 348. Fast on said shaft is an arm 349 engaging a stud 350 fixed in a lever 351 fulcrumed at 352 upon a supporting arm 353 which in turn is pivotally mounted on a shaft 354. A rod or bail 355 is supported upon end plates 356 fast on the shaft 354, the right-hand end plate 356 being normally supported by a toggle connection 357, one member of which is pivoted on the frame of the machine at 358. Bail 355 extends beneath a series of latches 361 (FIGS. 2, 6) directly controlling the successive action referred to.

Rocking movement of shaft 348, caused by a depression of either total key 278 or subtotal key 278', will through arm 349 rock lever 351 and arm 353 in clockwise direction, as viewed in FIG. 5. Clockwise movement of arm 353 effects also a clockwise movement to the lower arm of toggle 357, through means of link connection 353', thereby breaking the toggle and permitting bail 355 to be moved downwardly under the influence of a spring 360.

The right-hand latch of the series of latches 361 (FIG. 2) supported by bail 355 has link connection 362 with a member 363, freely rotatable upon shaft 354 and provided with an extension or tripping finger 364, adapted under the influence of spring 365, to disengage the segment latch 617 of the extreme right-hand or units order actuator 610. The pivot connection between members 361 and 362 lies below a plane intersecting the distal axes thereof, so that downward buckling of these parts is prevented only by bail 355. Therefore, upon release of the right-hand latch 361 from the restraint of bail 355, tripping finger 364 will act to release said right-hand actuator lever, which will thereupon be rotated by its spring 365 to rotate the related numeral wheel.

The above-described movement of member 363 will also, through link connection 366, move related hooks 367 into the path of movement of the stop member 457 of the related numeral wheels, said stop member 457 engaging the related hook 367 (see also FIG. 6) as the wheel comes into zero or clear registering position and causing the related type bar 611 to be positioned wherein the type at the printing line will represent the amount which has been subtracted from the related numeral wheel. Each adjacent latch 361 and related link 362 forms a toggle member normally holding the related higher order members 363 in latched condition, whereby the described lowering of bail 355 does not immediately release the latches 362 related to the members 363 in the denominational orders to the left of the units order. As each next right-hand or lower order numeral wheel arrives at its zero registering position to the toggle 361—362 immediately to the left is caused to be broken, so that the members 363 are operated successively under influence of their respective springs 365. This is effected by contact of the stop member 457 of the lower order wheel each time with the edge surface 371 of a dog 372, pivoted upon the zero stop 367 and engaging a shoulder of a push rod 373, pivotally connected to a tripping lever 374. Tripping lever 374 is provided with a lug 376 overlying the adjacent left-hand or higher order latch toggle link 361, and serves to break the toggle when the edge 371 rides to the top of the shouldered zero stop member 457.

The member 363 at the extreme left-hand end of the series has universal type connection 377 (FIG. 6) with a lever 378 fast to the left end of a transverse shaft 379. Secured to the opposite end of shaft 379 is a lever 380 (FIG. 5) provided with a lug 381 overlying a shoulder of a connecting rod 130 having pivotal connection with the latch 112 for the clutch release lever 106, earlier described. Heretofore, shaft 379 at the completion of a zeroizing operation would be rocked clockwise by a release of the higher order member 363, so that lug 381 may depress rod 130 and thereby initiate an automatic operation of the cyclic devices operable by clutch means 103—104 and thus effect a printing of the amounts set up on the type bars 611, as in well-known manner.

*Carriage Tabulating*

The platen carriage of the machine is tabulated from right to left under influence of a spring drum 8 (FIG. 7) connected to the carriage by a tape 9. Suitably supported in the end frames of the carriage is a tabulating program bar 1 provided with a series of notches 2 spaced in accordance with the columnar positions of a given form sheet, and adapted by engagement with a projection 6 of a detent lever 7 to secure the carriage against lateral movement of spring drum 8.

Under normal adjacent column tabulation the detent 7 is disengaged from bar 1 near the end of a machine cycle of operation by the downward movement of a member 184, operated in known manner, as set forth in U.S. Patent No. 1,946,572. Upon release of bar 1 by the end 6 of detent 7 the carriage will be pulled toward the left (FIG. 1) by the spring drum 8, and the detent, being immediately released by the member 184, will rise and ride on the under edge of bar 1. The carriage thereafter moves sufficiently to bring an adjacent one of the stop notches 2 of bar 1 into register with the end 6 of the detent 7, said end contacting a wall of the adjacent notch to arrest the platen carriage.

*Carriage Control of Registers No.1 and No. 2*

Well-known mechanical register control means for effecting a register selection and the character of operation to be performed thereon in accordance with the tabulated position of the record carriage are provided for the No. 1 and No. 2 registers, said control means being operated automatically upon release of a spring charged clutch operating lever 33 (FIG. 8) by a reciprocatory operation of a pin 23, of lever 20 (FIG. 7) in the earlier described movement of the carriage tabulating detent 7, as in the manner fully disclosed in U.S. Patent No. 1,946,572.

Upon operation lever 33 will engage a pin 37 fixed to clutch control lever 38, moving the latter about fulcrum 40 out of engagement with the usual pawl of the spring engaged one-cycle clutch means 24 of well-known design.

Clutch 24 is adapted to connect the motor 100 with a shaft 56, having fast thereon a crank arm 58 connected by link 67 (FIG. 9) with a rocker 69, loosely mounted on the shaft 301, to thereby impart a reciprocatory movement to said rocker. Rocker 69 has suitable spring connections 94, with a series of levers 93, connected each by a link 96 with one end of whiffletrees 86, the other ends of the whiffletress being connected with suitable feelers 83 adapted for sensing an index tube 82 of the carriage to thereby control register selection and operation in the well-known manner set forth in said U.S. Patent No. 1,946,572.

*Automatic Totals*

As set forth in U.S. Patent No. 2,780,407 issued February 5, 1957 to the present inventor, a total may be taken automatically through means of suitably placed cam plates on the flanged program bar 196 (FIG. 7) supported within the end frames of the shiftable record carriage. As the carriage is shifted into certain columnar positions, to be hereinafter described, a cam plate 267 (FIGS. 7, 10) is brought to rest upon a roller 268 of a lever 269 fast to a transverse shaft 270. Shaft 270 is pivotally supported within the base structure of the machine and upon an engagement of cam plate 267 with roller 268 will be rocked in a counterclockwise direction, as viewed in FIG. 10.

Secured to the left end of shaft 270 is an arm 271 having pin and slot connection 272 with a lever 273 fulcrumed at 274 to the left-hand framing of the machine. The forward end of lever 273 has engagement with a projection 275 of a pawl 276, pivotally mounted at 47 upon a bell crank lever 48. Projection 275 serves to normally hold pawl 276 out of the path of movement of a pin 68 secured in the rock arm 69 of the power operated register program control means earlier described. Upon counterclockwise movement of shaft 270, however, arm 271 imparts clockwise movement to lever 273 and the forward end of said lever moving downwardly will permit pawl 276, under influence of spring 277, to fall and rest upon pin 68.

Bell crank 48 is pivotally mounted to the framing at 49 and the forward end of said bell crank forms a toggle link connection 50 with an arm 51 fast to a shaft 52, normally tensioned under influence of a suitable spring 53 for clockwise rotation, as viewed in FIG. 10. Spring 53 through toggle action of link 50 serves to hold lever 48 normally against the stud 54 fast in the machine framing.

During a reciprocatory movement of rock arm 69, upon operation of the register program devices previously described, the surface 276′ of pawl 276 will now fall into the path of return movement of the pin 68. Lever 48 therefore during the last portion of the return movement of said pin will now be rocked counterclockwise beyond toggle center position, whereupon spring 53 will act to complete the movement and impart a clockwise rotation to the shaft 52, until stopped by contact of an arm 48′ of lever 48 with stud 54.

Pivotally mounted at 57 (FIG. 4) upon a crank arm 55, secured to the right-hand end of shaft 52, is a finger 59, provided with a projection 59′ normally overlying the forward end of the total key 278. In the above-described operation of shaft 52, finger 59 is carried downwardly to depress the total key 278 and thereby effect an automatic operation of the totalizing devices, as in the manner earlier described.

Near the end of the rotation of shaft 52 (counterclockwise as viewed in FIG. 4) the surface 59″ of finger 59 will contact the hub of crank arm 55 and cause said finger to be rocked free of the total key 278.

*Automatic Subtotal Control*

The taking of a subtotal differs from a total only in that the accumulator register is engaged with their actuator racks on both the forward and return strokes of the latter, so that the total subtracted from the register in the zeroizing operation is reentered on the return stroke.

Means under control of the record carriage are provided therefor whereby a total taking cycle of operation may be converted to a subtotal cycle of operation, as in the following manner.

Figure 3:
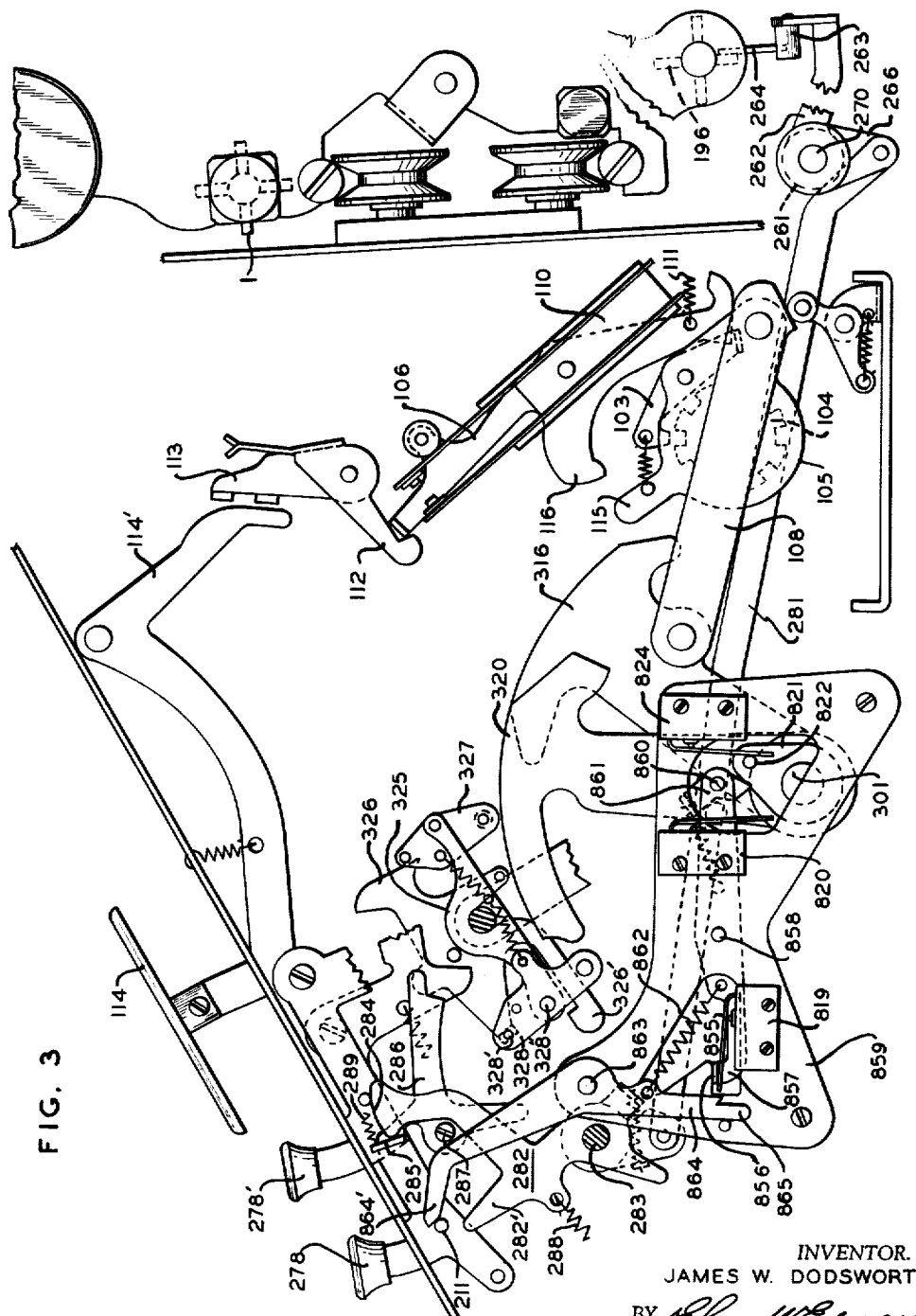
FIG. 3 is a right side elevation of said machine, showing the cyclic operating devices and control means therefor.

Loosely mounted upon the shaft 270 (FIG. 3) is a sleeve 261, on the left end of which is secured a rearwardly extending arm 262. Arm 262 is provided with a roller 263 positioned in the path of movement of a cam plate 264 fast to the program control bar 196 of the carriage. Fast to the right end of sleeve 261 is a downwardly extending arm 266 having link connection 281 with the lower end of a lever 282, fulcrumed to the machine frame at 283. The upper arm of lever 282 is provided with a projection 284 engaging a lug 285 of a latch 286 pivotally mounted at 287 to the framing of the machine. A suitable spring 288 holds lever 282 rocked in a counterclockwise position, as shown in FIG. 3, wherein projection 284 normally holds latch 286 upwardly out of cooperation with a stud 328′ of the forward cam follower 328. In the tabulating movement of the record carriage to a given columnar position the suitably placed cam member 264 is adapted to engage and depress roller 263 prior to a related operation of the roller 245 (FIGS. 7, 10) by its cam shoe 267 in operating the total taking means. Depression of roller 263, therefore, through arm 262, the sleeve 261, arm 266, link 281 and the lever 282 will act to release latch 286 for clockwise movement under influence of a spring 289 so that as the forward cam follower 328 is caused to be subsequently rocked clockwise about its fulcrum 328″ by a forward movement of the cam arm 320, earlier described, latch 286 falls into engagement with the stud 328′ to hold follower 328 out of cooperation with a return movement of cam arm 320. Cooperation of cam arms 316 and 320 with the cam followers 327, 328 act to control engagement of the accumulator wheels with the actuators 610 in the known manner earlier described with relation to FIGS. 3, 4. It is sufficient to say that follower 328 is now held rocked in clockwise position by latch 286 out of cooperation with the rearward surface 320′ of arm 320 in the return movement of said arm so that an active register will remain in engagement with the actuators 610 during their return movement and thus restore the totalized value back into the accumulator wheels.

*Automatic Carriage Return*

Power means for returning the record carriage is provided, such as described in the reference Patent No. 1,946,572 wherein an arm 315 (FIG. 4) secured to one end of a transverse square shaped shaft 199 is adapted, in a clockwise movement of said shaft, to tension a spring 317 secured to one end of a link 319. The opposite end of link 319 is pivotally connected at 322 to a latch 323 pivotally mounted upon a plate 329 fulcrumed at 330 to a suitable bracket fast to the machine framing.

Latch 323 is held by the tension of spring 317 against a stud 331 fast to a lever 163 mounted upon a transverse shaft 164. The lower end of lever 163 has link connection 162 with the arm 316, oscillated through link connection 108 (FIG. 3) by the motor driven crank arm 105, as earlier described. As lever 163 is rocked during the forward stroke movement of cam 316, latch 323 is permitted, under influence of spring 317, to move into the path of a return movement of the stud 331.

Near the completion of the operating cycle of the machine, stud 331 will act to engage the hook end of latch 323 and rock plate 329 upwardly about its fulcrum 330.

Plate 329 has flexible link connection 332 with a clutch operating member 333 and, as plate 329 is rocked upwardly, link 332 will exert a twisting action to the clutch lever 333 whereby suitable projections 334 will tend to impart a lateral movement to suitable friction discs 335 to cause operation of the well-known carriage return clutch means. Operation of the carriage return clutch effects return movement of the platen carriage through means of a ribbon tape 336 one end of which is wound upon a drum 337 of said clutch while the other end is secured to an arm 338 (FIG. 10) fulcrumed upon the left end of the platen support shaft 339. The arm 338 is also adapted in an operation of the carriage return means to effect the throat opening of well-known front feed devices such as disclosed in the patents of reference.

Suitable cam members 200 spaced upon the control bar 196 mounted within the carriage end plates are provided for cooperation with a roller 197 (FIG. 7) mounted upon an arm 198 fast to the square shaft 199, whereby to effect a clockwise operation of said shaft for initiating a carriage return movement and thereafter to effect a restoring of shaft 199 to terminate the carriage return movement, as in well-known manner.

While the known mechanical means and program devices associated therewith for effecting a selection and operation of the No. 1 and and No. 2 registers above described may be expanded so as to include the control of additional registers, as in the four-register machine illustrated in certain of the patents of reference, such a mechanical means is perforce limited as to the flexibility of register selection and in the number of registers capable of control thereby.

In order that the machine may be adapted to certain posting routines requiring other registers beyond the capability of control by the mechanical devices above set forth, additional amount registers are also provided, having electromagnetic control means therefor, as will hereinafter be described and being similar to the devices set forth in my copending applications to which reference was made earlier in this specification.

*Electromagnetically Controlled Registers*

As set forth in my said copending applications, there is dependent from the above-described machine a base section or unit including left and right side frame members 700—701 (FIGS. 11, 12). Mounted for rotatable movement and being vertically slidable in guide slots 702 of said frames are six transverse shafts 703 to 708 respectively. There is grouped upon each shaft a plurality of accumulator wheels, in the present instance ten being shown in each group, representing a ten place amount register of the crawl carry type and identified on the drawing (FIG. 11) as the No. 3, No. 4, No. 5, No. 6, No. 7, and No. 8 registers, the said registers being similar to the No. 1 and No. 2 registers to which reference is made earlier in the specification. It will be noted, however, that as best seen in FIG. 4, the No. 3 and No. 5 registers are each provided with both an add and a subtract control cam 738, 739 respectively to provide for crossfooter type operations while the remaining registers are equipped with single control cams 732 for vertical type operations, as hereinafter to be described.

Extending longitudinally of an adapted for selective engagement with the corresponding denominational order gear wheels 709 (FIG. 11) of the above registers are related order actuator rack slides 710. An upper end of each slide 710 is provided with rack teeth 713 having engagement with related gears 714, loosely mounted upon a transverse shaft 609 and each gear having engagement with a corresponding order of the actuator levers 610. Individual springs 716 serve to hold the related registers upwardly and normally out of engagement with the racks 710.

Secured to the right side framing 701 is a sub-frame 717 (FIGS. 12, 13) having fast thereon a series of inwardly extending stub shafts 718 (FIG. 14) upon each of which is loosely mounted a locking disc 719. The hub portion of each disc 719 has universal type drive connection by means of connecting links 720 (FIG. 12), with one end of a related one of the shafts 704, 706, 707, and 708 for the registers related to vertical type operations. Extending from each of the discs 719 is a drive pin 721, see also FIG. 13, having open end slot connection with a related operating lever 722, fast upon the left end portion of corresponding rock shafts 723. Shafts 723 each form part of the armature 724 (FIG. 12) of a related rotary type solenoid 725 of well-known structure, there being four of said solenoids fast upon a subframe 726 and arranged thereon in the manner as shown in FIGS. 12, 13. Each of the locking discs 719 is biased in counterclockwise direction by means of individual springs 727 each connected to a related one of the said operating levers 722. Related to each of the discs 719 is a latch member 728 (FIG. 14), pivoted at 729 to the subframe 717 and being held in a clockwise position, against tension of their respective springs 730, by means of suitable lugs 731 thereon engaging with the peripheral edge of the related ones of said cam discs 719.

As earlier described with reference to FIG. 4, fast on each end of the shaft 704, 706, 707, and 708 for the vertical total registers are corresponding cam collars 732 each having a flattened portion. Said flattened portion is normally in engagement with the underside of related cooperating cam blocks 733 fast upon a pair of slide members 734 mounted one each upon the left and right side frames 700—701 respectively through means of suitable studs 735. When selectively energized, as in the manner hereinafter described, the active one of the rotary magnets 725 (FIG. 13) effects a clockwise rotation to the related disc 719 and thereby to the collar cams 732 associated therewith. Upon said rotation the active collar cams 732 engage the related cam blocks 733 moving the corresponding register shaft downwardly to bring the gear wheels 709 (FIG. 11) thereon into engagement with the related racks 710. During the above described clockwise operation of any disc 719 a notch 719' cut in the periphery thereof is brought into locking engagement with lug 731 (FIG. 14) of the related latch 728, whereby the related collar cam is held in its active condition until released in the manner to be hereinafter described. Each slide 734 (FIG. 4) has an open end slot connection with a related pin 736 fast to a downwardly extending pair of arms 737 secured one to each end of the fulcrum shaft 421 for the cam plates 419, adapted to the control of the No. 1 and No. 2 registers earlier described. It will be recalled that the cam plates 419 for additive operations are rocked during the first portion of a machine cycle, that is, before any movement of the actuators 610 occurs and are restored after the actuators reach their extreme forward position. Thus during such operations the shaft 421 is immediately rocked counterclockwise and the arms 737 will move slides 734 rearwardly to displace the cam blocks 733 from the collar cams 732 and thereby permit any active register set by the collar cams to be lifted free of the racks 710 by their related springs 716. Following the completion of a forward movement of the actuator racks a restoral of slides 734 will be effected by the return movement of shaft 421 and a suitable cam edge 733' on the blocks 733, engaging the higher peripheral surface of the active cam collar 732, reengages the register with the actuators in time for the additive return operation thereof.

Register No. 3 on the shaft 703 and register No. 5 on the shaft 705, however, are each to be utilized for crossfooter operations and so must be adapted for registrations of both additive and subtractive character. Therefore, on each end of shafts 703, 705 is secured a collar having both an add and a subtract cam portion 738, 739 respectively. The add cams 738 extend rearwardly from shaft 703 and are in plane with related cam blocks 740 on the slides 734, while the subtract cams 739 extend forwardly and are adapted for cooperation with related cam blocks 741 mounted upon slides 734 forwardly of cams 739 and out of plane with the add control cams 738, 740. The said cams for the No. 3 and No. 5 crossfooter register shafts 703, 705 are controlled by special means as now to be described with reference to FIGS. 12, 15, and 16.

Suitably mounted to the left side framing 700 of the aforesaid base section of the machine are two similar units relating one to the No. 3 register and the other to the No. 5 register. The following description of one of said units is therefore descriptive also of the other. Each of said units includes a pair of laterally spaced end plates 742, 743. Fulcrumed at 744 for rotation upon plate 742 is a disc 745 having universal type link connection 746 with a slotted collar 747 (FIG. 12) secured to the left end of the respective shafts 703, 705 for the registers No. 3 and No. 5. Secured to said disc 745 is a pin 748 which extends leftwardly, through a suitable opening 749 of the plate 742, and above a pair of crossed arms 750, 751 (FIG. 16). Arm 750 is fast to the armature shaft 752 of a rotary type solenoid 753 secured upon plate 743 rightwardly of the pin 748, as viewed in FIG. 16, while lever 751 is secured to the armature shaft 754 of a similar type solenoid 755, mounted upon plate 743 leftwardly of the pin 748. Energizing of solenoid 755, however, effects a counterclockwise operation to its armature shaft 754 and the related arm 751 engages pin 748 to cause a clockwise rotation of the disc 745 and thus to the register shaft 703. As viewed in FIG. 4, a counterclockwise rotation of shaft 703 will cause the collar cams 738 to engage the related cam blocks 740 and move shaft 703 downwardly to thereby immediately engage the accumulator gears for the No. 3 register with the corresponding racks 710 (FIG. 11). Said register is thereby disposed for an additive operation in the movement of control plate 419, as in the manner fully set forth in connection with an additive operation relative to the other registers. In the clockwise operation of shaft 703 above described, however, cams 738 will rotate away from cam blocks 740 while cams 739 will rotate into the path of movement of the cam blocks 741. It will be recalled that in a first part of a machine cycle of operation the cam plates 419 displace slides 734 rearwardly. Thus cams 741 now engage the active cams 739 and will move the shaft 703 downwardly for engaging the register pinions with the racks 710 prior to any movement thereof and upon a subsequent movement of the racks the accumulator wheels are rotated subtractively. Thereafter the slides 734 are restored in the first part of a return stroke of the machine cycle to disengage the active register while permitting the racks to return idly, as is customary to a subtractive operation for such machines.

*Totalizing the Magnetically Controlled Registers*

For effecting total and subtotal operations of any of the registers No. 3 to No. 8, cam plate 419 (FIG. 4) during a machine cycle of operation is operated as in the timed manner earlier set forth in connection with an operation thereof incident to the totalizing operations for the No. 1 and No. 2 registers, said operations of said cam plate being well known and fully set forth in the reference patents.

The lower registers No. 3–No. 8 are also of the crawl carry type and are zeroized selectively by the successive release of the related actuators 610, 710 under control of the toggle devices shown in FIGS. 2, 5, and 6, in the manner earlier described in relation to a totalizing of the upper registers No. 1 and No. 2. The connections between said lower registers and the said toggle devices are shown in FIGS. 2, 5, 6, and 11, and operate as follows.

It will be recalled that an operation of the total key 278 acts to effect a release of the toggle latch 361 for releasing the lower order actuator 610 for the registers. At the same time operation of said latch will act to release for clockwise operation the total hooks 613 of the adjacent higher order column. Each of the total hooks 613 has pin and slot connection 500 with a related bell crank lever 501 loosely mounted upon a transverse shaft 502, supported within the framing of the upper base structure of the machine. A lower arm of each of said bell cranks 501 has pin and slot connection 503 (FIGS. 2, 11) with related bell crank levers 504 loosely mounted upon a transverse shaft 505, supported within the end framing of the unit housing the lower registers. Each of the bell crank levers 504 has link connection 506 with the forward one of a pair of bell cranks 507 loosely mounted upon support shafts 508, 509 respectively. The lower arms of the related bell cranks for each pair are connected together by means of corresponding links 510. Each of the pairs of bell cranks 507 also has pivoted connection 511 with a longitudinally extending bar 512, provided with a series of zeroizing stop teeth 513 cooperable with the zero stops 457' on the related order of the accumulator wheels for the registers No. 3 to No. 8, as in the manner described for the total hooks 613 in relation to a totalizing of the No. 1 and No. 2 registers. Thus, upon the described tripping of the lower order of the actuators 610 the related actuator slides 710 are moved forwardly and will effect a clockwise operation to the lower order accumulator wheel for the particular register selected for totalizing. The successive release of the related total hooks 613 for each order are timed to operate the corresponding train 500, 501, 504, and link 506 for rocking the related pairs of bell crank levers 507 in clockwise direction in time to lift the zeroing stops 513 into the path of movement of stop lugs 457' of the accumulator wheels of the lower registers prior to operation thereof by the release of racks 710. As each lower order accumulator wheel moves into engagement with the related stops 513 the corresponding lug 457' engages a rock pawl 514, pivoted at 515 upon the stop bar 512, and will impart thereto a counterclockwise rotation. Upon counterclockwise operation of pawl 514 a lug 514' on the lower end thereof engages a related projection 516 on a slide 517, supported upon studs 518 on the bar 512, and will impart a rearward movement to said slide. Slide 517 has pin and slot connection 519 with a lever 520, intermediately fulcrumed at 521 as shown in FIG. 11, and during said movement slide 517 acts to impart a counterclockwise movement to lever 520. The upper end of lever 520 has a lateral projection 520' engaging the rearward edge so as to impart upward movement to the push rod 373 (FIG. 2) adapted to the releasing of the next adjacent higher order of the toggle devices 361 utilized in effecting the zeroizing operations, as previously described.

During the totalizing operation the amount subtracted from the active register will be set in the type bars 611, following which the machine will be caused to cycle upon the release of clutch lever 106 by tripping the latch 112 (FIG. 5) in response to a clockwise operation of the lever 380 during the zeroizing of the highest order numeral wheel, as in the manner previously described.

As earlier set forth the taking of a positive subtotal differs from a positive total only in that the totalized accumulator register must remain engaged with the related actuator racks 610 or 710 on both the forward and return strokes of the actuators so that the total subtracted from the register in the zeroizing operation is reentered on the return stroke.

It is contemplated for the program of operation hereinafter to be described that the total and subtotal operations are performed automatically under control of the record carriage. With reference to the latter, it will be recalled that as the carriage is shifted to a columnar position in which a total is to be taken, a suitably placed cam shoe 267 (FIG. 7) carried thereon will act to depress a roller 268, this operation being effective, to enable mechanism which will operate during the subsequent immediately following selector cycle to provide for rotation (clockwise in FIG. 10, counterclockwise in FIG. 4) of the shaft 52 for depressing the total key to initiate a total-taking operation. Also a program subtotal is effected automatically under control of the record carriage not by depressing the subtotal key 278′ but rather by depressing the total key 278 and at the same time pulling link 281 (FIG. 3) in rearward direction to release latch 286. Thus any operation of the register control plate 419 by the flipper means 327, 328 is prevented and any active register now remains in engagement with the actuators 610, 710 during the return stroke movement of said actuator.

*Totalizing Negative Totals*

If the total is negative, it will stand in the register as the complement of the true negative total. As more fully disclosed in the U.S. Patent No. 1,915,296, to which reference is made for details of operation not herein described, the complemental negative total is converted to the true negative value by means of a series of storage segments 143 (FIG. 2) located at the front of the machine. The first step in taking either a positive or a negative total is the same and involves zeroizing the total out of the accumulator wheels. In the case of a negative total, the zeroizing will cause the highest order wheel to register "9," and the zeroizing movement of the associated rack from eight to nine printing position will cause an ovedraft control shaft 146 (FIG. 18) to be rocked counterclockwise, thereby throwing the negative total control devices of the machine into operation to control three consecutive cycles of machine operation during which the complemental negative total will be converted to the corresponding true negative value and printed, all as fully set forth in the above reference patent. During the initial zeroizing operation, the forward movement of the index bars 611 will set the complemental total into the storage segments 143. The segments are held at this digital setting during the first and second cycles. In the second cycle, the segments limit the forward excursion of the actuator racks whereby the complemental total is subtracted from the register, which stands at zero, thereby causing the true negative value to be registered. The third and final cycle comprises a conventional total-taking cycle wherein the true negative value is zeroized from the register and set up in the type bars, which are then operated at mid-cycle to print the true negative total.

Since the clutch control lever 106 (FIGS. 3, 5) is normally latched in clutch disengaging position at the end of a single cycle of operation as described earlier, provision is made in negative totalizing operations to allow the machine to continue through the necessary plural cycles of operation by disabling latch 112. To this end, operating movement of the overdraft shaft 146 (FIGS. 18, 19) will unlatch a plate 159 for clockwise rotation under the urge of a pivoted arm 160 which is biased clockwise by a suitable spring 165. A lug 161 of the plate 159 will accordingly be moved to blocking position above the lower upturned end 130′ of the slide 130 (now in lowered position) whereby latch 112 (FIG. 3) is prevented from reengaging with the clutch control lever 106. Therefore, near the end of the cycle, when lever 106 is restored clockwise by projection 115 it will not be engaged by latch 112 but will again be free to rock counterclockwise for continued cyclic operation of the machine. At the completion of a third cycle of operation, the overdraft control means is restored in known manner and a printing effected, whereafter lever 106 is permitted to reengage latch 112 and so terminate the operation, as in the manner fully described in the said Patent No. 1,915,296.

*Totalizing Negative Subtotals*

A negative subtotal requires four cycles of machine operation, the first three of which are substantially the same as in the taking of a negative total with the exception that printing is not effected during the third cycle. On the fourth cycle, the true negative value is subtracted from the accumulator (which has been zeroized in the third cycle) to cause the latter to register the original complemental value, and it is printed at mid-cycle.

For a complete disclosure of the mechanism which controls negative subtotal operations, reference is made to Fleming Patent No. 2,050,302 dated August 11, 1936. As disclosed therein the negative subtotal mechanism is enabled in response to a forward spring urged movement of a link 191 (FIG. 18). The forward end of link 191 is connected to one arm of a three-armed lever 188 pivotally mounted on a shaft 189. The lever 188 is coupled to a rocker member 194 by means of a pin 188a fast on the former extending through a slot of the latter. Rocker member 194 is biased clockwise by a spring 190 but is normally held in the inactive position by a latch 187. The latch is tripped through means of a crank arm 178, link 179, and plate 180 upon counterclockwise operating movement of the overdraft control shaft 146 in response to the zeroizing of the negative total, whereupon spring 190 will rock lever 188, and therefore rocker 194, clockwise to shift link 191 forwardly to operated position. The clockwise movement of lever 188 will also cause a lateral stud 195 thereon to engage and hold latch 286 in unoperated position even though the latter element has been released from the restraint of the lever 282 (FIG. 3), which has been previously rocked clockwise through means of a suitable subtotal control cam on the carriage, in the manner as previously described for initiating a regular subtotal operation.

To prevent operation of the negative subtotal mechanism when a total operation is initiated (rather than a subtotal operation) a depression of the total key 278 will carry a pin 211 therein downward to a position behind the lever 282 blocking said lever and also the rocker 194 (FIG. 18) against clockwise movement if latch 187 should be tripped in response to operation of shaft 146 upon zeroizing a negative total.

When a program subtotal operation is initiated, however, it is obviously essential that rocker 194 with three-armed lever 188 not be prevented from operating since the value to be subtotaled may be negative. As described earlier a program subtotal is initiated by automatically rocking lever 282 clockwise and depressing the total key, the movement of lever 282 being effected before the total key descends. Accordingly, by the time stud 211 of the total key stem moves into the range of lever 282, this latter element will have been rocked to bring an upwardly extending arm 282′ to a rearward position whereby stud 211 descends to a position in front of said arm rather than behind it. Hence, lever 188 and rocker 194 will be free to operate if the value being subtotaled is negative.

As fully set forth in Fleming Patent No. 2,050,302, slide 191 is restored to rearward position at the extreme end of the fourth cycle of a subtotal overdraft operation, whereby the above parts are restored also to their normal position as follows:

An arm 203 is pivoted at 194′ to the lever 194 and is provided with a pivoted extension 204, these parts being guided by contact of arm 203 with a fixed roller 205, and by the action of a spring 207 attached to the extension 204. The rear end of arm 203 is provided with a tooth 208, engaging a pin 209 fixed in the plate 180. The setting of shaft 146, arm 178 and plate 180 into negative total position, together with the forward movement of arm 203 caused by the action of spring 190 on rocker 194, will serve to locate the pin 209 at the extreme end of the tooth 208. Upon the restoration of shaft 146 and plate 180, pin 209 will be moved downward, against the upper face of tooth 208, depressing the rear end of arm 203 and bringing a shoulder 210 of extension 204 into the path of movement of pin 202 of the cam arm 320 operated by the cyclic clutch means as earlier described. Thus the return stroke of arm 320 will act at the extreme end of the fourth cycle of subtotal overdraft operation to pull extension 204, arm 203, lever 188, together with rocker 194 and slide 191 into their normal restored positions.

*Carriage Control for the Electromagnetic Registers*

The electromagnets 725, 753, and 755 for the No. 3–No. 8 registers are adapted to be energized selectively in accordance with the columnar positions of the record carriage, whereby to effect a control of the related registers for a giving posting routine, such as that illustrated in FIGS. 1–1A, to be hereinafter described. Special circuit control means for the said electromagnets are provided which include a plurality of gang switches 756 (FIG. 17) mounted upon a fixed bar 757, extending transversely of the rearward end of the machine, said switches being numbered 756A–756I in the wiring diagram illustrated in FIGS. 1–1A. Each of said switches is mounted for slidable adjustment along the bar 757 and is locked in a selective columnar position, by means of set screws 758. Each of the gang switches 756 has an operating arm 759 pivoted thereto at 760 and which terminates at the upper end thereof as a cam element 761. A related spring leaf 762 engages each arm 759 above the pivot 760 whereby to hold said arms lightly against the forward contact member of the related switch 756 and to position the cam 761 into the path of movement of a cooperating roller 763, fast to a rearwardly extending arm of a lever 764, fulcrumed at 765 to a bracket 766 fast upon a cross tube 767 secured within the left and right side framing of the shiftable record carriage. A suitable spring 768 biases lever 764 counterclockwise against a limit stop 769 formed on the flanged bar 195 of the carriage, whereby roller 763 is held in a raised position for cooperation with the cams 761 in the carriage shifting operations for a posting routine hereinafter to be described, and utilizing the above sets of gang switches 756.

*"Cycle Billing" Program*

Heretofore, the lower register and electromagnetic control devices therefor are applicable to effecting program routines of the character set forth with respect to applicant's copending applications of reference. However, such earlier devices are not capable of effecting certain type program routines which, for example, may require that not only totals but also subtotals (either negative or positive in character) are to be transferred from selective ones of the registers to other selected registers, in both crossfooter and in vertical total operations.

Preliminary to describing applicant's novel control devices by which the registers are now adapted to be controlled in selective combinations during a series of machine operations related to a posting routine requiring that a transfer of both total and subtotal values be effected, a brief summary will first be set forth illustrative of a "Crossfooter" column of printed information such as may be required, for example, in a "Cycle Billing" posting routine sequence.

Figure 1:
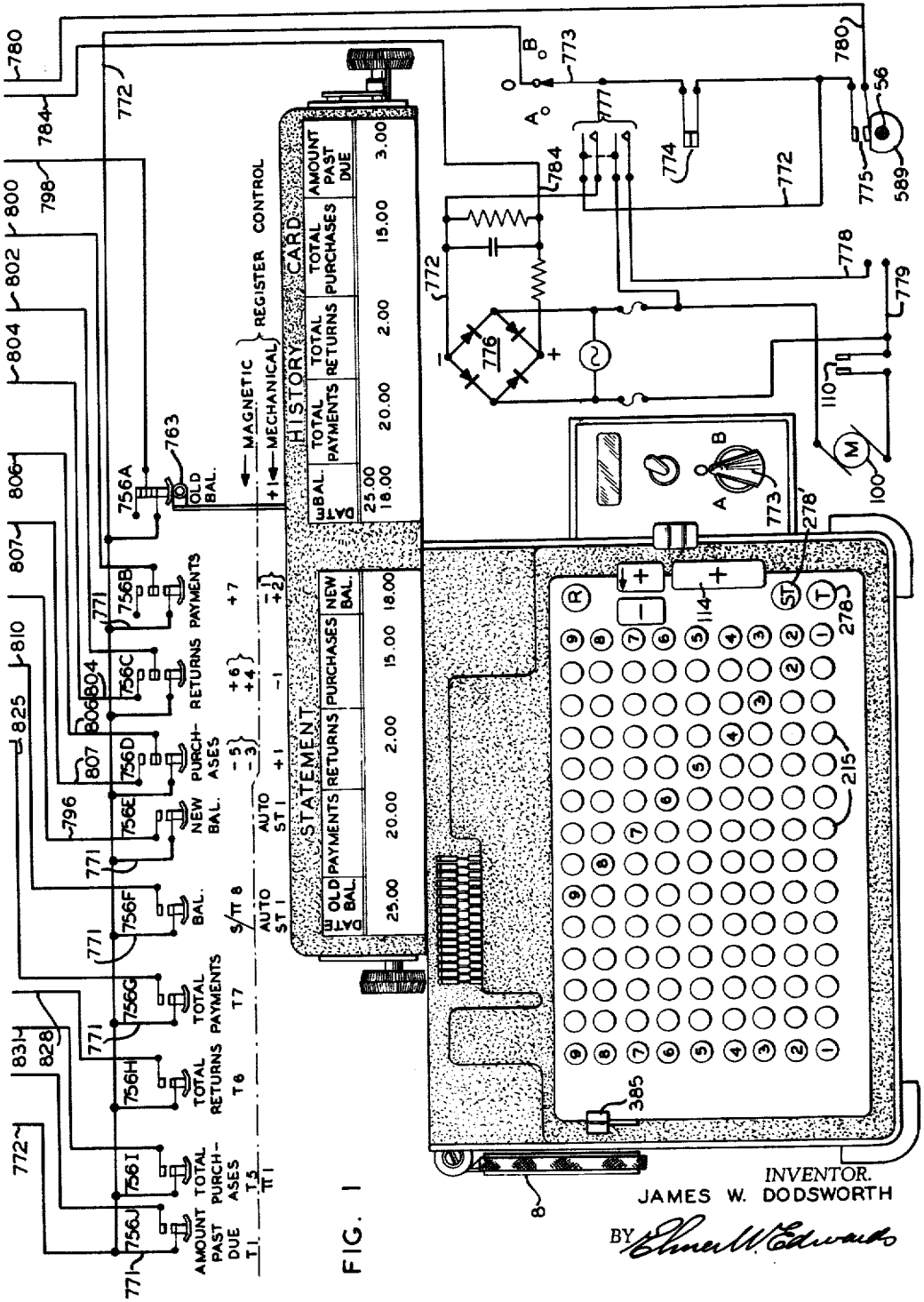

The well-known customers "Statement" form and a corresponding "History Card" are first inserted within the shiftable record carriage in usual manner, the "Statement" form being positioned to the left of the "History Card," as shown in FIG. 1. It will be recalled that the printing columns are determined by a notched tabulating bar 1 on the carriage, and in the preferred embodiment shown said printing columns are, reading from left to right, as follows: the "Old Balance," to which the carriage is positioned for the first entry; the next printing position, as the carriage moves to the left, is the "Payments" column; then, in turn, the "Returns" column; the "Purchase" column and as the final column for the "Statement" sheet the "New Balance." Thereafter, the carriage shifts to the "History Card" for bringing to printing position in successive order the "Balance" column; "Total Payments" column; "Total Return" column; "Total Purchases" column; and finally an "Amount Past Due" column.

Upon the completion of a run with respect to the above crossfooter operations vertical totals may thereafter be taken from certain ones of the registers at selective columnar carriage positions and transferred to other registers in the manner and purpose as will hereinafter be described.

*Control of Registers in Crossfooter Posting Operation*

In the contemplated mode of operation for effecting a posting routine, such as herein set forth, certain of the registers are controlled by the electromagnetic program devices for operations in selective combination with the No. 1 and No. 2 registers of the mechanical program means and with other ones of the electromagnetically controlled registers in accordance with the columnar positions of the record carriage, as will now be described with particular reference to the wiring diagram illustrated in FIGS. 1–1A.

It is recalled that for each columnar position to which the record carriage may be shifted there is provided a gang switch 756 (see also FIG. 17) operable by a roller 763 on the carriage, said switches being numbered 756A to 756J from right to left on the diagram. Each of said switches has a contact arm having circuit lead connection 771 respectively to a common terminal lead 772 which extends by means of a plurailty of normally closed circuit switches 773, 774 connected in series therein to the negative side of a power rectifier 776. Suitable on/off manual switch means 777 is also provided in said circuit and adapted when closed to supply power from source line 778 to both the rectifier and to the electric motor 100, for which the normally open clutch switch means 110 earlier described is interposed in the power circuit line 779.

Upon positioning of the record carriage in the extreme right-hand position so as to bring the left-hand or "Old Bal." column of the statement sheet to active printing position the roller 763 on the carriage will engage switch 756A. Since no electromagnetically controlled register is involved at this time in this column, the circuit line 798 leading away from this switch terminates at open switch 799. However, the program tube 82 (FIG. 9) for the mechanical program devices calls for a selection of the No. 1 register in a plus character of operation upon the operation of the selection clutch 24 as an incident to said carriage movement, as in the well-known manner previously described. Usually the first entry to be made is that for a new balance on the statement sheet, being the last previous balance as taken from the history card. This amount (25.00) is entered on the digit keys 215 and upon depression of the plus operation key 114 is entered additively within the No. 1 register during a consequent machine cycle of operation in the usual and well-known manner. Upon completion of this cycle of operation the carriage then tabulates to the next adjacent or "Payments" columnar position. Here the mechanical program clutch 24 is again automatically tripped, effecting a selection of the No. 1 register for a subtract control operation and the No. 2 register for an additive control operation, as determined in known manner by the program tube 82. At the same time, carriage roller 763 in moving to the "Payments" column has closed the contacts for the switch 756B and thereby extends ground circuit through means of a lead line 800, the normally closed contacts 801 of a gang switch controlled by a relay 786 realting to vertical totals to be hereinafter described, and the normally closed contacts of a snap switch 783D in series circuit with the rotary solenoid 725D controlling the No. 7 register. The plus side of said solenoid having connection with the positive service line 784 to rectifier 776, said solenoid is immediately energized and in rotating the related cam 732 will bring the No. 7 register into meshing engagement with the teeth of the actuator racks 710 (FIG. 11). During this operation solenoid 725D rotates the related locking disc 719 (FIGS. 13, 14) into locking engagement with the corresponding latch 728 for holding the register in the above active set conditions. Also a lug 728' on said latch serves to disengage the contact switch 783D, thus breaking the circuit to said solenoid. A payment of 20.00 is now set up on the keyboard and the operating key 114 is again depressed to start the machine cycle of operation. During the first part of the forward stroke of the instant machine cycle the control plate 419, rocked by the control devices previously described with reference to FIG. 4, releases the No. 2 and No. 7 registers free of engagement with their actuator racks 610, 710 for the forward or subtractive stroke of the rack movement, while at the same time register No. 1 is moved into engagement with racks 610. In the return stroke of the machine cycle plate 419 is restored and releases the No. 1 register while reengaging the No. 2 and No. 7 registers with their racks prior to the return operation of said racks, so that the amount (20.00) subtracted from the 25.00 previously stored in the No. 1 register is also additively entered into both the No. 2 and No. 7 registers.

Following such entry the carriage tabulates to the adjacent "Returns" columnar position and the program clutch 24 for the mechanical selection means is again tripped, with the program tube 82 calling now for a subtract operation of the No. 1 register. During the above carriage shift operation roller 763 releases the contact switch 756B. It is recalled that from the previous operation the related latch 728 is now holding the locking disc 719 for the No. 7 register operated, so that switch 783D has remained opened. During the above operation of the mechanical program devices as relates to the "Returns" columnar position, however, a cam member 589 (FIG. 8) on the driven shaft 56 of the program selection clutch 24 will effect an operation of a pivoted lever 590 to cause engagement of the normally open contacts of a switch 775, for extending negative circuit to a lead line 780 and thereby energizes a restore solenoid 791 (see also FIG. 14) adapted for momentarily displacing rightwardly a slide member 794. Slide 794 is provided with a plurality of pins 796 adapted during said movement to restore any active ones of the latch members 728 and by so doing releases any previously active register, while causing also a reengagement of the contacts for the instant active one of the switch members 783A–E, as in the manner disclosed for the devices of applicant's earlier filed applications.

During the above described movement of the carriage to the "Returns" columnar position, roller 763 effects engagement of a plurality of contacts representing the switch 756C. Upon closure of switch 756C negative service from lead 772 is extended from said switch by means of a lead 802, through normally closed contacts 803 of the vertical total relay 786, and thereafter through the normally closed switch contacts 783C whereby to energize the No. 6 register selection solenoid 725C (see also FIG. 13). At the same time, negative circuit is also extended from the switch 756C through a lead 804, normally closed contacts 805 of relay 786 and the normally closed contacts of switch 783A, thereby energizing also the solenoid 725A for displacing the No. 4 register (FIG. 11) into engagement with the actuator racks 710. As earlier described for the solenoid 725D related to the No. 7 register, operation of solenoids 725A and 725C will act to displace their respective locking discs 719, so that related latches 728 now hold registers No. 4 and No. 6 in their set condition. Also the respective switch members 783A and 783C are disengaged for deenergizing solenoids 725A, 725C in the locking movement of said latches.

An amount 2.00 representing a return item is now set up in digit keys 215 and the operating key 114 is again depressed to initiate a machine cycle of operation, whereby said amount will be added within the registers No. 4 and No. 6 and substracted from the No. 1 register, as in the manner set forth with respect to the previous entry for the "Payments" column, and following which the carriage now tabulates to the adjacent "Purchases" column.

In the "Purchases" column the roller 763 will close the contacts of switch 756D and so extend negative circuit to separate leads 806, 807. Lead 806 extends circuit through normally closed contacts 808 of relay 786 and normally closed switch 783F' to the solenoid 755A adapted for adjusting cam 739A (FIG. 4) for providing a subtractive control of the No. 5 register. Lead 807 extends circuit through normally closed contacts 809 of the relay 786 and normally closed contacts 783F to the solenoid 755 adapted for adjusting cam 739 for providing a subtractive control of the No. 3 register. During the above carriage shift to the "Purchases" columnar position the setting clutch 24 again is automatically tripped and will effect at this time a mechanical program selection of the No. 1 register for a plus control operation. During operation of the setting clutch 24 switch 775 again is operated by cam 589 to momentarily energize magnet 791 for restoring the latch members 728, whereby such registers and switch means 783 as were locked in adjusted condition during the previous operation are now released to normal condition. In such restoring action the latch members 728 are operated only momentarily and they are free at the conclusion of the setting clutch cycle for immediate cooperation with any operated locking discs 719 associated with the instant active registers and with the corresponding switch members 783 related thereto.

An amount 15.00 as set up on the keyboard is now entered by the operating key 114 and will be subtracted from both the No. 5 and No. 3 registers. Each said register at present standing at zero, a complemental amount 9999998500 is thus caused to be stored therein. At the same time the amount 15.00 is caused to be added to the algebraic sum (3.00) as accumulated and stored within the No. 1 register from the described previous operations, so that the amount now stored within the said register No. 1 is 18.00. Following a completion of this operation the carriage shifts to the "New Balance" column. Here an automatic subtotal operation is caused to be effected by means of the adjustment of latch 286 (FIGS. 3, 18) by the control plate 264 on the record carriage together with an automatic operation of the total key 278 by the control cam 267, as in the known manner previously described. This will print the above amount $18.00 in the "New Balance" column, with said amount being retained in the No. 1 register for subsequent use, hereinafter to be described.

The above operation being the final entry on the "Statement" sheet the carriage will automatically shift to the first or "Balance" column of the "History Card." It may be pointed out at this time that the hereinafter described crossfooter entries for all the columns on the history card are effected automatically in a series of carriage controlled operations, leaving the operator free for other purposes.

The new balance (18.00) from the No. 1 register is to be first printed on the history card by an automatic subtotal operation which operation is effected for the No. 1 register in the same manner as just set forth for the immediate previous subtotal operation. In this column it is desired to have the new balance of 18.00 be entered also within the No. 8 register as a subtotal transfer from the No. 1 register during the instant operation. Therefore, roller 763 has effected engagement of the contact switch 756F related to the "Balance" column of the "History Card." This will extend negative circuit from the service line 772, by lead 771, the closed contacts of said switch 756F, the lead line 810, normally closed contacts 811 of vertical total relay 786 and thence by means of lead lines 812, 813 to one side of a normally open pair of contacts 814 of a multicontact relay switch 815 designated herein as the "Transfer Relay." The other side of said contacts 814 has line connection 816 to one side of the switch 783E in series circuit with the No. 8 register selection solenoid 725E, earlier described with respect to FIGS. 13, 14.

One side of transfer relay 815 has lead connection 817 to the positive service line 784 and the other side has circuit connection 818 which extends through a normally closed switch 819 in series circuit with one side of a normally open switch member 820. The other side of switch 820 is connected to negative service line 772. Fast to the main operating rock shaft 301 of the machine is an arm 821 (see also FIG. 3) provided with a pin 822 adapted in the normal position of rest of shaft 301 for engaging an arm 823 of a snap switch 824 whereby to maintain the contact elements of said switch normally in closed condition, for the purpose hereinafter to be described.

As earlier set forth shaft 301 is rocked counterclockwise during the first half of a machine cycle of operation and is returned during the second half of the cycle. At the end of the forward or counterclockwise operation of shaft 301 the pin 822 of arm 821 effects closure of the switch member 820, thereby energizing the transfer relay 815. Energizing of said relay will effect the closure of all the related contact elements thereof and it will be recalled that circuit was previously established from the carriage switch 756F to the particular contacts 814 of said relay. Upon such closure of contacts 814 a circuit is now extended through line 816 and closed switch 783E to energize the rotary solenoid 725E (FIG. 13), which thereupon rotates the cam means 732 (FIG. 4) for cooperation with the related cams 733, whereby the No. 8 register is caused to be brought into engagement with the actuator racks 710 at the end of the forward stroke of the above cycle. Operation of solenoid 725E it is recalled also operates the related locking disc 719 for engagement with its latch 728 to hold the register in engaged condition, as said latch disengages the contact switch 783E for deenergizing solenoid 725E.

As previously described with reference to FIGS. 3, 4 the control pawls 327, 328 are caused by carriage controlled latch 286 to be adjusted ineffective of cooperation with the cam levers 316, 320 during subtotaling operations. Thus during the return stroke of the instant cycle of machine operation the cam plate 419 and consequently slide 734 remain inactive. Therefore during the instant return cycle both the registers No. 1 and No. 8 will remain in engagement with their respective actuator racks 610, 710 and the new balance amount (18.00) in the return stroke of said actuators is now caused to be not only restored within the No. 1 register but will also be entered as a subtotal transfer within the No. 8 register as well. At the completion of the above operation it may be noted that both the said registers have remained in their active set condition while the carriage thereafter shifts to the adjacent "Total Payments" column position. However, tabulation of the record carriage to the "Total Payments" column will, as heretofore described, again initiate a cyclic operation of the mechanical program clutch means 24 during which operation the program tube 82 will call for normalizing the No. 1 register free of the actuators 610. Also, during operation of clutch 24 the shaft 56 and cam 589 thereon again will operate switch 775 for energizing the restore magnet 791 to release the latch 728 from holding disc 719E, thereby freeing the No. 8 register from engagement of the related actuator racks 710.

While the above would be sufficient were positive totals only to be provided for, it is contemplated with respect to the present invention to provide also for such transfer wherein a negative total value may also be involved. Therefore lead line 810 from carriage switch 756F is extended also to one side of the contact switch 824 held normally closed by pin 822 of the rock arm 821 earlier described; and to be more fully set forth hereinafter with reference to negative total operations occurring in connection with a vertical total sequence program of operations.

During the latter described carriage shift operation of the crossfooter program, roller 763 reopens switch 756F and closes the contact switch 756G, whereby negative circuit is now extended over lead 825, normally closed contacts 826 of the vertical total relay 786, a lead 827 to lead 800 and extending through closed switch 783D to solenoid 725D for controlling a selection of the No. 7 register. For this carriage position it is desired to print by means of an automatic total operation the total payments (20.00) as earlier stored upon the No. 7 register during the operations described with reference to the "Payments" column of the statement sheet. Such automatic totalizing operation of register No. 7 is effected by means of a cam 267 suitably placed on the carriage and adapted for depressing the roller 263 of the total taking control means, as in the known manner previously described. Following the above operation for the "Total Payments" column the carriage shifts now to the adjacent or "Total Returns" column where a second control cam 267 on the carriage will again provide for an automatic total taking operation, whereby the amount previously stored in the No. 6 register will be cleared therefrom and printed, as in the manner just described for register No. 7, said No. 6 register having been selected for operation upon the closing of related carriage switch 756H, whereby circuit is extended from said switch, by means of lead line 828, normally closed contacts 829 of vertical total relay 736, lead 830 to the lead 802 and thence to the solenoid 725c for controlling the setting of the No. 6 register to active condition. Following such total printing operation for the "Total Returns" column the carriage will now tabulate to the adjacent or "Total Purchases" column.

It is recalled that for the "Purchases" column of the statement sheet a purchase amount (15.00) as set up in the keyboard has earlier been entered subtractively and remains stored as a complemental value 9999998500 within the No. 5 register. At this time it is desired to print said complemental total as a true negative amount and at the same time also to transfer the said complemental value to combine with the normal subtotal amount (18.00) that has remained stored within the No. 1 register. Therefore as the carriage shifts to the "Total Purchases" column the roller 763 thereon effects engagement of the contact switch 756I and extends negative circuit by means of a lead line 831, through normally closed contacts 832 of the vertical total relay 786, and a lead 833 extending through closed contact switch 783G' to the solenoid 753A for the No. 5 register (see also FIG. 16). Said solenoid is thus immediately energized and will rotate the No. 5 register shaft 705 counterclockwise, as viewed in FIG. 4. As earlier set forth support shaft 705 for register No. 5 is equipped with both add and subtract control cams 738, 739 and during said counterclockwise operation the add control cam 738 engages the cooperating cam block 740 related thereto on slide 734, whereby said register is immediately moved downwardly into engagement with the related actuator racks 710 (FIG. 11). Meanwhile the above carriage shift operation has also tripped the selection clutch 24 of the mechanical program means. During the instant cycle of said clutch the cam 599 on clutch shaft 56 again closes switch 775 for energizing the restore relay 791 and thereby will normalize any register remaining set from the previous operation, as in the manner earlier described. At the same time operation of clutch 24 will in accordance with the program tube 82, cause shaft 403 for the No. 1 register (FIG. 2) to be rotated counterclockwise until the subtract cam 121 (FIG. 4) on said shaft is brought into position for subsequent cooperation with the cam surface 124 of the control cam 419', previously described.

Again, an automatic total cam 267 (FIGS. 7, 10) has also depressed the roller 268 so that the above operation of setting clutch 24 acts also to initiate a total taking operation of the now engaged No. 5 register. At the completion of the regular successive zeroizing operation incident thereto, and since a complemental amount (9999998500) appears upon said register, the highest order actuator rack in moving from 8 to 9 registering position will act to trip off the well-known true negative total devices, in the manner previously described and as more fully set forth in U. S. Patent No. 1,915,296. Following completion of said successive zeroizing operation the lever 380 (FIG. 5) acts to depress slide 130 for tripping latch 112 free of the clutch lever 106 for releasing the machine cyclic clutch means 103, 104 (FIG. 3) for starting a machine cycle of operation. It will be remembered that for printing a true negative total the machine, under control of the overdraft devices, makes three cycles of operation. Also it is remembered that depression of the total key 278 (FIG. 4) serves to adjust the control plate 326 whereby pawls 327, 328 cooperate with the operating cam levers 316, 320 during the first overdraft cycle to adjust cam plate 419 counterclockwise in a first part of the return stroke of said levers during said cycle and to restore said cam plate 419 clockwise again at the completion of the return stroke of levers 316, 320. The above operation of cam plate 419, through arms 737 also effect therewith a rightward and return operation of the cam slides 734 for the lower registers. Thus during the first overdraft cycle the No. 5 register remains engaged with the related actuator racks 710 during the first half or subtractive portion of the machine cycle of operation while register No. 1 remains in normal inactive position with respect to the actuator racks 610. In the return stroke of cam lever 320, a hook 326' of control plate 326 having been previously rocked forwardly of a pin 328' on the pawl 328 during depression of total key 278, said lever engaging said pawl will act to adjust plate 419 counterclockwise and cam 124 will engage the previously adjusted cam 121 of the No. 1 register shaft 403 to adjust the No. 1 register to active condition. At the same time, slide 734 moves rearwardly to release register No. 5 to inactive condition. Thereafter the actuators 710 in their return stroke move idly with respect to the No. 5 register while the actuators 610 will act to additively transfer the totalized complemental amount 9999998500 to the stored amount 18.00 appearing on the No. 1 register so that a registration of 3.00 now remains stored thereon. At the completion of the said first overdraft cycle the plate 419 is then restored, through engagement of a pin 324 on rock arm 318 with a downwardly extending arm 325' of rocker 325, for reengaging the No. 5 register with the actuator racks 710 and for disengaging the No. 1 register from its actuators 610. As in the well-known manner previously described the above complemental value during the first cycle of operation is also caused to be stored upon suitable segment members 143.

As the machine continues for a second cycle the parts will again operate as above, so that the complemental amount stored upon segments 143 is now caused to be subtracted from the cleared No. 5 register and to be added to the 3.00 as now stored in the No. 1 register, so that register No. 5 thereafter reads 15.00 while register No. 1 reads 9999998800. During the third cycle of overdraft operation both the registers are again adjusted as before and the 15.00 is now cleared in a second totalizing operation from the No. 5 register and thereafter printed upon the "History Card" as the total purchases. Also said amount (15.00) is caused to be added to the last complemental amount (9999998800) now appearing in the No. 1 register, whereby the said amount of $3.00, as representing the difference between the previous old balance amount and any amounts credited in the crossfooter operation, is now again stored within the latter said register.

Following the operations above set forth the carriage will shift to the adjacent "Amount Past Due" column where the program clutch 24 is again tripped into operation for effecting a selection of the No. 1 register, while a third cam 267 on the carriage again provides for an automatic total taking operation thereof, as in the manner described heretofore. During said total taking machine cycle of operation register No. 1 at this time is caused to be cleared and the amount 3.00 is printed upon the record form, and this would conclude the instant crossfooter posting operations.

Following the final crossfooter operation the record carriage is automatically returned rightwardly to the first columnar position, as in the known manner earlier described with reference to the carriage return devices illustrated in connection with FIG. 4. As before, the program tube 82 of course again determines a selection of the No. 1 register with reference to the first column in the operation of the selection clutch 24 incident to the termination of said carriage return movement.

*Successive Automatic Totals for Vertical Columns*

For the program described herein it is desired that a single manipulation of the known vertical total lever 385 (FIGS. 9, 10) shall act to initiate a first vertical total operation and that thereafter, as the record carriage shifts to successive columnar positions, a series of vertical total operations from selective registers which may include a transfer of amount therefrom to selected ones of other registers with respect to certain columns of the record sheets shall be entirely automatic; as controlled in the known manner earlier set forth by means of suitably placed control cams 297 (FIG. 7) on bar 196. Said bar is adapted for rotative adjustment whereby an appropriate series of said cams are brought into an active condition for vertical total control operations.

The various amounts now remaining stored in the respective registers at the completion of the previously described crossfooter operations may be summarized by the following table:

Register No. 1—Cleared
Register No. 2—Total Payments 20.00
Register No. 3—Total Purchases 9999998500
          (complemental)
Register No. 4—Total Returns 2.00
Register No. 5—Cleared
Register No. 6—Cleared
Register No. 7—Cleared
Register No. 8—New Balance 18.00

With the carriage returned to the first or "Old Balance" coumn the operator, noting that a final posting series of operations has been completed, will adjust bar 196 and thereafter initiate an automatic vertical total series of operations by a manual rearward movement of the vertical total lever 385. A rearward setting of lever 385 acts to release for operation the clutch 24 of the mechanical program devices, adjust means to effect tripping of the successive totalizing devices of the numeral wheels and will adjust the mechanical program control for modifying the register selection, all as in the manner fully set forth in the U.S. Patents No. 2,134,280 and No. 2,756,926 of reference.

Briefly, rearward movement of lever 385 will adjust suitable stops 383 downwardly, said stops subsequently cooperating with projections 389 to limit any control operation of links 96 and modify thereby the control thereof as exercised by the program tube 82, for controlling operation of the mechanical program devices earlier described with relation to FIGS. 8, 9. To release clutch 24 for operation the rearward movement of lever 385 acts to impart clockwise movement to a bell crank lever 393 (FIG. 10) and, by means of link connection 395, also counterclockwise movement to a bail 397, loosely mounted upon the shaft 270. One end of bail 397 extends beneath a bell crank 399 (FIG. 8) and imparts thereby a counterclockwise movement to said bell crank. Upon said movement a pin 401 of the bell crank 399 will move a slide member 404 leftward, whereby said slide engaging a pin 406 trips release lever 27 from clutch control plate 33. Plate 33 thereupon moving upwardly will release clutch 24, as in the known manner previously described.

As fully set forth in the above Patent No. 2,756,926, operation of bell crank 393 (FIG. 10) by a rearward movement of vertical total lever 385 serves to rock the lever 273 for releasing a pawl 276, whereby the above operation of the register selection devices will act to cause a depression of the total key 278 for releasing the successive totalizing means and to adjust the register control means of FIG. 4 as in the manner earlier set forth in the present specification. Thus for the vertical total operation at this time in the operation of clutch 24 the No. 1 register is caused to be readjusted to a nonadd setting from the previous subtract control setting related to the crossfooter operations.

Also, at this time circuit is now extended from the closed contacts of carriage switch 756A (FIG. 1) over lead 798 to the contact switch 799 of the vertical total relay 786, previously described. As shown in the wiring diagram (FIG. 1A) said relay has two sets of contact members associated with each of the carriage switches 756A–756J, the right-hand set being normally in engaged circuit with the respective leads of said carriage switches for the crossfooter operations, earlier described.

To modify selection and operation of the electro-magnetically controlled registers from a crossfooter program control to the vertical total program of control the rearward adjustment of vertical total lever 385 will operate a control arm 386' (FIGS. 9, 10) of a snap switch 386 to close the contacts 386" (FIG. 1A) of said switch. Upon closure of contacts 386" ground circuit from service line 772 is extended to the negative side of the vertical total relay 786. The opposite side of said relay is connected to plus service line 784, so that said relay is now immediately energized and will adjust leftwardly (FIG. 1A) all of the control contact elements of said relay 786. Each of the said control contacts having circuit lead connections to the corresponding carriages switches 756A–756J, as described. At this time therefore the circuit from carriage switches 756A–756J are all disconnected from the right side contacts which relate to the crossfooter operations and are engaged with the corresponding left side contacts of the vertical total relay 786 for controlling selection of the registers relative to the vertical total program, as hereinafter to be described.

For the "Old Balance" column relative to vertical totals no entry will be made in any register. However, the above operation of setting clutch 24 by the operation of vertical total lever 385 having determined the register No. 1 to be programmed for a nonadd operation, as above set forth, it is necessary now to bring up some other register which is available for operation, this being necessary merely for excepting an automatic zero totaling operation incident to the above setting clutch operation at this time in order to cause a subsequent shifting operation of the record carriage. Therefore, a circuit lead 797 from the left side contact of switch 799 has connection with lead line 802 for the No. 6 register selection solenoid 725C. It will be recalled from the above table that the No. 6 register is now in cleared condition. However, in the present instance, under control of one of the cams 297 (FIG. 7), a zero totalizing operation will be effected in said register and at the completion of which the carriage will tabulate to the adjacent "Payments" columnar position.

It will be recalled that for the crossfooter operation in the "Payments" column the mechanical program tube control called for the No. 2 register, and that a payment of 20.00 as then entered remains stored in said register. For the vertical total program the No. 2 register is at this time again caused to be selected by the program tube device and is automatically totalized, while the No. 1 register is continued in the described selection for a nonadd operation by virtue of the rearward adjustment of the vertical total lever 385.

At the same time, the carriage now being in the "Payments" columnar position, ground circuit from carriage switch 756B is extended as before by means of lead 800 to the contacts 801 of relay 786. In the present instance however said circuit is now continued from the left side of contact 801 along a lead line 834 to the lead 835 connected at one end to one side of a normally open pair of contacts 836 of the transfer relay 815, previously described. The other side of said pair of contacts has connection, over lead 837, to the line 800 for the No. 7 register control solenoid 725D. The lead line 834 extending from contacts 801 of relay 786 has connection also, by means of a lead 838, to a line 839 connected to one side of the normally closed contacts of the end of cycle switch 824, to which reference was made earlier in this specification. The other contact of switch 824 has lead connection 840 with the negative side of a relay member E.C., herein identified as the "end of cycle relay," and being connected also to the positive service line 784 through means of a lead line 841.

The E.C. relay embodies a plurality of contact switches each of which includes a center contact arm 842. Contacts 842 normally are in engagement with related contacts 843 of the relay switches, each contact 843 having connection 844 to the negative side of a correspondingly numbered one of a plurality of holding magnets 845. Holding magnets 845 relate each to the corresponding No. 3 to No. 8 registers electromagnetically controlled as earlier described. Contact arms 842 of relay E.C. each has connection, by means of respective lead lines 3ª–8ª, to one side of the normally open correspondingly numbered 3 to 8 switches of the transfer relay 815, previously described with respect to the transfer of totals operations in connection with the crossfooter program. Relay E.C. includes also a plurality of contact elements 846, each normally out of engagement with corresponding ones of the center arm contacts 842. Contacts 846 are all connected to a common lead 847 which connects at its opposite end with lead line 780 extending to the restore relay 791, earlier described also with reference to FIG. 14.

From the above, it will be observed that for vertical total operations in the "Payments" column a circuit from the closed carriage switch 756B is thus passed to both the E.C. relay and to the No. 7 holding coil 845 and that both are thus immediately energized. Also, it is noted that current from switch 756B in lieu of going directly by lead 800 to the solenoid 725D controlling the No. 7 register, as for the crossfooter operations, is now interrupted by the open contacts 836 of the transfer relay 815.

Upon energizing of the E.C. relay all the contacts 842 are immediately moved out of engagement with the corresponding contacts 843 and into engagement with the contacts 846 of said relay. Any active holding coil 845 is thus immediately released, while the circuit is now extended over lead 847 and 780 to immediately energize the restore magnet 791 (see also FIG. 14), for the purpose hereinafter to be described with reference to overdraft transfer operations.

At the completion of the instant totalizing operation for the No. 2 register the cyclic clutch means 103—104 (FIG. 3) is tripped by arm 380 (FIG. 5) of the totalizing devices, as in the manner previously described. During the consequent machine cycle of operation pin 822 in the immediate counterclockwise movement of arm 821 (FIG. 1A) releases the end of cycle switch 824 to deenergize the E.C. relay, earlier described. Upon deenergizing of said relay all the contact members 842 are released from contacts 846 and are reengaged with the contacts 843. Thus in the present instance the circuit previously described relative to the particular contact 843 for the holding coil 845 related to the No. 7 register is again restored to reenergize said coil, while at the same time a release of the contact 842 from contact 846 corresponding with the number seven switch of said relay acts to deenergize the restore magnet 791 and thereby release latch members 728 to the control of cam discs 745, which thereby reopens the contacts of any snap switches 783A–783E associated with the registers selected for activity.

At the extreme end of the forward stroke of the arm 821 in a cycle pin 822 effects a closure of the forward stroke switch 820, whereby a ground circuit from lead line 772 is now extended through the normally closed contacts of switch 819 and along lead 818 to the transfer relay 815. Said relay is thereby energized and will effect a closure of all the contact elements associated therewith, including contacts 836 of the selected circuit for the No. 7 register control solenoid 725D, above described. Thus in the present instance the No. 7 register cam 732 (FIG. 4) at the end of the forward stroke of a machine cycle will be rotated by said solenoid and thereby engage said register with the actuator racks 710, as in the manner earlier set forth.

During the return stroke of the cyclic parts, cam arms 316, 320 (FIG. 4), the total key having been earlier depressed, now cooperates with the control pawls 328, 327 in the known manner previously described, whereby during the first part of the return movement, cam 320 engaging pawl 328 moves the control plate 419 upwardly to release the No. 2 register from engagement with actuator racks 610 prior to their return stroke of movement, and following which pin 324, engaging arm 325 acts to restore said register to inactive setting in the restoring operation of plate 419. In the above operation, however, of plate 419 the slide 734 moves also in time therewith and cam blocks 733 on said slide are thus caused to be moved immediately rearward free of the control cams 733 on the register shafts. Therefore, unless other means are provided, this would cause the selected transfer register to be released prior to a return stroke of the actuators 710 and a transfer would fail to be effected.

In order to properly effect transfer of a stored amount, either positive or negative, from any selected register to any selected vertical total register applicant provides the following special means whereby to prevent such early release of the transfer register at this time.

As shown in FIGS. 4, 4A, and 12 there are six holding magnets 845 mounted upon each left and right side frames 700, 701 respectively. Said magnets are arranged to serve as left and right pairs positioned beneath the usual collar cams mounted on the opposite ends of the respective support shafts for the Nos. 3–8 registers. When a register is moved into the active or lower position the particular magnets 845 associated therewith will be contacted by the collar cams on that register shaft and if energized the magnet will act magnetically to hold the register in active set condition. At the end of the forward stroke of the above vertical total operation therefore magnet 845 for the No. 7 transfer register having been energized will act to hold said register in active condition as cam block 733 is carried rearwardly free of collar cams 732 in the first portion of the return stroke of the instant machine cycle. Upon return stroke movement of the cyclic arm 821, pin 822 immediately releases the forward stroke switch 820 and thus deenergizes transfer relay 815 for reopening all the contact elements thereof. This will open the present active circuit from carriage switch 756B to solenoid 725D of the No. 7 register, by disengaging contacts 836 of the particular relay switch indicated by the numeral seven. It will be remembered however that the latch member 728 still remains in locking engagement with notch 719' of the related locking disc 719 and holds control cams 732 for said register in active rotated condition, which also thereby holds snap switch 783D related thereto in open circuit condition.

At the end of the return stroke of arm 821, pin 822 now reengages the end of cycle switch 824 for reclosing the circuit to the end of cycle of relay E.C. Therefore, said relay is now again energized and will adjust all the contact elements 842 thereof free of contacts 843 and into engagement with contacts 846. Release of the active contact 843 for the number seven switch now releases the holding magnet 845 for the No. 7 register. At the same time circuit from common lead 847 of the switch 842 is closed to again energize restore relay 791, which thereby restores the latch member 728 free of latching engagement with the disc 719. Upon restoral of latch 728 the contacts 783D of the related snap switch are reengaged and at the same time register No. 7 is free to raise, by suitable spring means, to its inactive position; the collar cams 732 at this time being again in their normal position free of the cam blocks 733, said blocks having been previously restored in the return forward stroke movement of slide 734.

During the above-described vertical total operation in the "Payments" column therefore the amount (20.00) previously stored in the No. 2 register is not only cleared therefrom and printed in usual manner upon the record sheet but is also caused to be stored within the No. 7 register for subsequent use, to be hereinafter described.

Following the above set forth operation the carriage tabulates in regular manner to the adjacent "Returns" columnar position. For vertical totals no value entries are required for any registers in this column. However, circuit lead 802 from the carriage switch 756C to the left side contact 803 of the vertical total relay is extended over lead 797 and 802 for again selecting the No. 6 register for a zero totalizing action, whereby as before to effect a blank subsequent machine cycle of operation merely for the purpose of providing carriage tabulation through this particular column.

The next adjacent column is the "Purchase" column and here also no active registration is called for, but a blank zeroizing total taking operation for register No. 6 again is effected as in the manner and purpose just set forth for the preceding column, the circuit for the No. 6 register being in this case extended from carriage switch 756D, lead 806, the left side contact of closed switch 808 and thence by leads 797, 802 as before.

Following the latter blank entry cycle the carriage tabulates now to the "New Balance" columnar position, where the operation is again the same as above set forth, with however in this instance contact switch 756E being closed to extend circuit over line 796 to the now closed contacts 795, and thence again by leads 797, 802 to the No. 6 register selection solenoid 725C.

The carriage comes now to the "Balance" column for the "History Card" and in this column it is desired to print the new balance vertical total (18.00) as stored in the No. 8 register, thereby clearing said register, and to transfer said amount for future purposes within the No. 7 register. To effect selection of the No. 8 register for the totalizing operation, circuit is effected to the control solenoid 725E related thereto, over now closed carriage contact switch 756F, lead 810, the closed left side contact 848 of the V.T. relay and thence by means of a circuit line 849 between said contact 848 and solenoid 725E. It will be noted that for the vertical total operation the register No. 8 as now selected for the "Balance" column is immediately engaged with the actuator racks for the total taking operation, whereas in this column with respect to the crossfooter operation the selection of register No. 8 was not effected until the return movement of the actuators, so as to receive a transfer from the No. 1 register, which latter register, however, at this time continues to be inactive of operation, by virtue of the previous setting of vertical total lever 385.

In order to effect a transfer of the said stored amount (18.00) from register No. 8 to register No. 7 a lead line 850 connects switch 848 with the lead line 838. Lead line 838, it is recalled, has connection at one end to one of the normally open contacts 836 of the number seven switch forming one of the elements for transfer relay 815, as previously described. The other end of lead 838, by means of lead 839, the normally closed end of cycle switch 824 and lead 840 connects with the E.C. relay, as earlier described. With exception therefore that now the transfer of amount is made from the No. 8 register to the No. 7 register such transfer operation is effected in manner similar to that previously set forth with respect to a transfer from the No. 2 register to the No. 7 register. At the completion of the transfer total operation the new balance 18.00 has been printed and the No. 8 register cleared, while said amount has now been added by transfer to combine with the 20.00 total payments earlier transferred to the No. 7 register from register No. 2, previously set forth.

In the next adjacent or "Total Payments" column no entry is to be effected and the contact 826 of the V.T. relay 786 being closed with the left side contact connected to lead 797 circuit in this instance again is extended over leads 797, 802 to the No. 6 register control solenoid 725C. In this column also therefore the operation calls for merely a blank totalizing of the No. 6 register whereby to continue the sequence of operation to the next carriage position, as in the manner and purpose described heretofore in connection with certain other columnar positions of the carriage.

In the next or "Total Returns" columnar position the total returns amount (2.00) accumulated within the No. 4 register during crossfooter operations is desired to be transferred to the No. 7 register whereby to be combined with the amount 38.00 now stored therein. To effect such transfer a circuit from the carriage closed switch 756H extends by means of lead 828 to the now closed left side contacts 829 of the V.T. relay and thence over leads 851, 804 to the No. 4 register selection solenoid 725A. Said solenoid is thereby energized and will rotate the shaft 704 (FIG. 4) and thus cams 732 therewith to immediately engage the No. 4 register with the actuator racks 710 (FIG. 10). In this column an automatic totalizing operation is caused to be effected as in the manner described for the preceding columns. Also, the left side contact of vertical total switch 829 related to this column has a circuit lead connection 852 with the lead line 838 associated with selection of the No. 7 register. Thus, following a zeroizing of the No. 4 register and a printing of the amount 2.00, representing the total returns stored therein, said amount during the total taking operation is caused also to be transferred to the No. 7 register as in manner previously described for other transfer operations thereto, and thereby is added to the 38.00 stored therein from the previous operations, the stored amount thus now being $40.00.

Following the above automatic totalizing with transfer operation the carriage shifts to the adjacent or "Total Purchases" columnar position. In this column, it is desired at this time to effect an automatic total of the No. 3 register and to transfer any amount as previously stored therein to the No. 7 register. It will be recalled however that the No. 3 register is a crossfooter type register, in that both add cams 738 and subtract cams 739 (FIG. 4) are provided for this register. It will also be recalled that purchase amount entries are programmed therein subtractively and that a total purchases amount (15.00) was earlier stored thereon in the complemental form as 9999998500.

It is desired in this column that such overdraft amount not only be printed as a true negative value but also to be transferred in the complemental form and added as such to the positive value (40.00) now stored in the register No. 7. Register No. 3 therefore will be selected for an automatic totalizing operation in the "Total Purchases" column, by means of circuit lead 831 from now closed carriage switch 756I to the vertical total switch 832, now closed to the left side contact thereof, and then by means of a circuit lead 853 to the control solenoid 753 (see also FIG. 16) for said No. 3 register. Solenoid 753 is thus immediately energized and will rotate register shaft 703 counterclockwise, as viewed in FIG. 4. Upon counterclockwise operation of shaft 703 the plus control cam 738 rotates therewith to engage cam block 740 for thereby bringing the No. 3 register into engagement with the actuators 710 prior to a movement thereof. At the same time the associated locking disc 745 (FIG. 15) for said register is rotated and latch 728 in engaging the notch 719 thereof will disengage the contacts of switch 783B in the circuit with solenoid 753 to deenergize said solenoid. Meanwhile, a blank selection operation of the program clutch 24 is effected by reason of the carriage shift operation and, as in the manner heretofore described, will trip off the successive zeroizing means for the totalizing devices, following which a machine cycle of operation is caused to be automaticaly initiated, all as in the well-known manner and fully set forth earlier in the specification. In the present instance, however, the total being complemental, well-known overdraft devices, earlier set forth with respect to FIGS. 18, 19 and being fully described in U.S. Patent No. 1,915,296 of reference, will cause three cycles of machine operation whereby to convert, in known manner, the complemental value registration (9999998500) on register No. 3 to a true negative total registration and to print the same as a true negative total value ($15.00).

As earlier stated it is also desired in this column to have the complemental registration appearing on register No. 3 transferred as such to the No. 7 register. Special means are therefore provided, as hereinafter described, whereby to cause a selection of the No. 7 register in the first part of the return stroke of the first machine cycle related to an overdraft operation and to thereafter, following a restoral thereof to inactive condition at the end of the first cycle, to disable any further operation of the said register No. 7 during any succeeding machine cycles incident to an overdraft control operation.

It will be recalled that a normally closed snap switch 819 (FIGS. 1A and 3) is in series with the circuit lead 818 between the transfer relay 815 and the snap switch 820 operated by pin 822 at the extreme end of the forward stroke of arm 821 operated by the cyclic clutch devices 103, 104. Switch 819 includes an operating arm 855 underlying a lug 856 of a lever 857 pivotally mounted at 858 upon subframe 859 of the machine. Pivotally mounted at 860 upon the rearward end of lever 857 is a one way pawl 861 adapted to yield idly to the forward or counterclockwise movement of the pin 822 of arm 821. During the first part of a return operation of arm 821 however pin 822 will engage pawl 861 and impart first a counterclockwise movement to the lever 857 and thereafter, moving past said pawl, will immediately release said lever for restoral by a suitable spring 862. While in normal single cycle operations of the machine this will cause the switch 819 to momentarily open and close during a return stroke of the cyclic devices no particular significance is attached thereto.

As stated above, for negative totals applicant provides novel means whereby a complemental amount stored within any given register will be transferred as such a complemental amount during a first machine cycle of an overdraft operation. Thus the heretofore repeated selecting operations of any transfer register as otherwise effected during the usual multiple machine cycles incident to an overdraft operation in effecting such a transfer will be eliminated in the operation of the present devices. In the instant example therefore above described the selected tranfer register No. 7 will be disabled following the first control cycle of overdraft operation, as in the following manner.

Pivotally mounted at 863 (FIG. 3) upon subframe 859 is a lever 864, the lower end of which comprises latch means 865 positioned forwardly of the normally raised position of lug 856 of the switch lever 857 above described. When total key 278 is in its normal raised position latch 865 is held in a counterclockwise position, against tension of springs 862, by engagement of an upwardly extending arm 864' of lever 864 with a pin 211 mounted upon said total key. Upon a depression of total key 278, however, pin 211 releases lever 864 for spring tensioned engagement with the forward edge of lug 856. Thereafter in the counterclockwise operation of switch arm 857, in the manner above set forth, latch 865 moves rearwardly for engagement with lug 856 to hold lever 857 in said counterclockwise condition. Thus lug 856 engaging arm 855 of the snap switch 819 will hold said switch in open circuit condition until pin 211 in a subsequent restoring operation of the total key 278 engages a lower cam edge on lever 864 and imparts thereto a clockwise operation to disengage latch 865 from the lug 856, and thereby restores the contacts of switch 819 to normal engaged condition.

As in well-known manner, total key 278 is released from suitable latching means 223 (FIG. 5) near the end of a regular total taking cycle of operation by the downward movement of an arm 163 engaging roller 295 of the well-known keyboard clearing devices, fully set forth in the patents of reference. However, as previously described, and more fully set forth in the said reference patents, an overdraft signal effected in a movement of the highest order actuator arm 610 from its 8 to 9 registering position, acts to trip the overdraft shaft 146 (FIG. 18) for counterclockwise movement. During said movement of shaft 146 an arm 152 fast thereon acts, through a link connection 151, to raise an arm 150 and thus hold pawl 295 out of cooperation with said operating arm 163. It is recalled that in true negative total operations the overdraft control shaft 146 is not restored until near the end of the third or final cycle of the overdraft control operations. Thus total key 278 now remains in depressed position throughout the multiple control cycles of overdraft operation, and switch 819 is held in open circuit condition thereby until released by the restoration of total key 278 at the end of the final cycle of such operations, following a restoration of the control shaft 146, in the well-known manner.

Relative to the "Total Purchases" column, the carriage switch 756I being closed, a circuit is extended therefrom, by means of the left side contact of the vertical total switch arm 832 and leads 838', 838 and 835 to the normally open contacts 836 for the particular switch member indicated by the numeral 7 of the transfer relay 815. It will be noted therefore that for the first cycle of the above overdraft operation for register No. 3 the switch 819 remains closed at the end of the forward stroke, whereby to energize transfer relay 815 for closing contacts 836 and so provide for a selection of register No. 7 for the transfer of the complemental value 9999998500 thereto in the return stroke of said cycle. It will also be noted that switch 819 thereafter remains open in the subsequent overdraft operations related to register No. 3, whereby the transfer relay 815 remains deenergized so that the contacts 836 will remain open during said subsequent operations and the register No. 7 therefore remains inactive during the above repeat cycles for conversion of the complemental total to a true negative total with respect to the No. 3 register.

It is remembered that register No. 7 is provided only with add type control cams 732 (FIG. 4) and that in total taking operations slide 734 moves rearwardly in the return movement of arms 316, 320, in the manner as previously described. Thus again for the above transfer operation unless special means are provided register No. 7 would be released prematurely during the first part of a return stroke of the first overdraft control cycle as the cam blocks 733 are moved free of the cams 732 on the register shafts. Therefore, upon the above closing of carriage switch 756I a circuit is now extended also from the left side contact of switch 832 and over lead 838' to lead 839 and thence passing through normally closed switch 824 will energize the end of cycle relay E.C. earlier described.

At this time circuit is also extended from the vertical total switch 832, over leads 838', 838, 834, and 835, to a lead line 7ª connected to the center element of the particular switch member No. 7 comprising the E.C. relay. Said relay having been energized as above described the said center contacts thereof are brought into engagement with the related lower contacts shown in FIG. 1A. Therefore, circuit is now immediately extended, over lead lines 847, 780 to energize the restore magnet 791. Said magnet upon being thus energized will operate slide 794 (FIG. 14), thereby holding latch members 728 free of the corresponding locking discs 719 related to the No. 7 transfer register. At the same time slide 798 (FIG. 15), operated with slide 794 through shaft 797, will release the related latch 728 free of the corresponding locking disc 745 for the actively set No. 3 total register. Said operation of the latch 728 for the No. 3 register however has reengaged the contacts of switch 783G related thereto, so that said register is maintained in active set condition.

It will be recalled that immediately upon start of the first overdraft cycle pin 822 (FIGS. 1A, 3) releases snap switch 824 to open condition, thereby deenergizing the E.C. relay. This will release the center contacts 842 thereof from the circuit 847 for the restore relay 791 and will close to the contact side 843 for the holding coils 845. Thus in the present instance circuit from active lead 7ª previously described is now extended to energize the particular holding coil 845 related to the No. 7 register. As previously described pin 822 at the end of the forward stroke will effect closure of the contacts of snap switch 820 for energizing the transfer relay 815. Thus at this time contacts 836 of said relay will close and extend circuit over leads 837, 800 to energize the operating solenoid 725D for moving the No. 7 register into active engagement with the actuator racks 710 (FIG. 11), as in the manner fully set forth earlier in the specification.

Immediately in the return stroke of pin 822 switch 820 is released to deenergize the transfer relay 815 and so will open contacts 836 thereof, which in turn opens the circuit to the active register selecting solenoid 725D. However, said register is now maintained in lowered engaged position with the racks 710 not only by the usual locking disc 719 earlier described but also by virtue of a magnetic engagement of the cams 732 on the register shaft with the energized No. 7 holding coil, which is secured directly beneath said cams, as heretofore described with reference to FIG. 4. From the above it will be obvious therefore that during the return stroke for the first cycle of the overdraft total transfer operation the rearward movement of slide 734 (by cam lever 320) will displace cam block 740 from the rotated cam 730 to release the No. 3 register from racks 710, while at the same time the holding coil 845 for the No. 7 register maintains the latter said register in engagement with racks 710 as cam blocks 733 are displaced free of cams 732. During the above return stroke for the first overdraft cycle therefore the complemental value 9999998500 totalized from register No. 3 is now transferred to the No. 7 register.

At the end of the return stroke cam 316 acts to restore slide 734 and cam block 740 again reengages register No. 3 with actuator racks 710. However, pin 822 at the extreme end of the return stroke has reengaged contact switch 824 for again energizing the E.C. relay which thereupon will reopen the circuit 844 to the No. 7 holding coil 845 while reestablishing circuit over lead 847 whereby to operate restore relay 791 for releasing the corresponding latch 728 from disc 719 for register No. 7 so that said register is thereupon free to disengage from racks 710. It will be noted however that in said operation of restore relay 791 the switch 783G thereof is now reclosed to again effect circuit to solenoid 753 for holding register No. 3 in active condition.

It is recalled that with total key 278 in depressed position the latch 865 (FIG. 3) is free to engage lug 856 of control lever 857 for switch 819. Thus upon operation of lever 857 by engagement of pin 822 with one way pawl 861 in the return stroke of cycle arm 821 latch 865 engaging lug 867 holds switch 819 now in an open circuit condition. Thereafter in a regular second cycle of the overdraft operation the zeroized No. 3 register only will be effected for operation, to subtract therefrom the complemental value stored upon the storage segments 143 (FIG. 2). Again during the succeeding or third cycle of overdraft control the No. 3 register only is active for operation and during which a second totalizing operation thereof serves to zeroize said register, while printing the true negative total of the complemental value stored thereon, in the well-known manner. During the latter cycle of operation the overdraft control shaft 146 (FIG. 18) is restored, as in the manner fully set forth in reference Patent No. 1,915,296 so that link 151 moving downwardly permits subsequent engagement of roller 295 by arm 163 near the end of the cycle to trip latch 223 from total key 278. Upon release of total key 278 pin 211 will raise therewith and engaging end 864' of lever 864 will disengage the latch end 865 thereof from lug 856 of lever 857, whereby switch 819 is now restored to normal contact closed condition.

At the completion of the above described operation with respect to the "Total Purchases" column therefore the No. 3 register is now clear, the true negative amount of the complemental total 9999998500 is printed as 15.00 with said complemental total having now been additively transferred and combined with the previous amount 40.00 stored within the register No. 7, so that within the latter said register remains stored now the amount of 25.00.

Following the above operations the carriage will shift to the final columnar position, corresponding to the "Amount Past Due" column of the crossfooter operations. In this position the carriage roller 763 will act to close the switch 756J, whereupon circuit is extended therefrom to the closed left side contacts 866 of vertical total relay 786, and hence by means of lead lines 827, 800 to the solenoid 725D. Said solenoid thus again being energized effects selection of the No. 7 register, this time for a normal total taking operation thereof under control of the carriage cam 267 (FIG. 10), as in the regular manner previously described. Thus at this time there will be printed in the above column the total 25.00 as stored within the No. 7 register and leaving said register now cleared.

If now this amount checks with the 25.00 of the previous old balance a proof is provided that no error has occurred in the pick up of the old balance amount when effecting the new balance entry.

As in the manner described in U.S. Patent No. 2,756,926, upon a completion of the above final automatic vertical total operation the vertical total lever 385 (FIG. 10) is restored by suitable cam means secured to the control bar 196 on the record carriage, acting to rock a lever 271 having a pin 272 thereon counterclockwise. Said pin 272 has connection with a rearward arm of a bell crank lever 414 and imparts thereby a clockwise movement thereto, so that an upwardly extending arm of said bell crank engaging a pin 415 serves to lift a suitable latch member 412 free of the locating pin 385" for lever 385 and permitting said lever to restore to its normal forward position by means of a suitable spring 387. Upon restoration of vertical total lever 385 a spring 411 (FIG. 8) connected at one end to the slide 404 and at the opposite end to bell crank lever 399, will restore the parts 393–399 (of FIGS. 8, 10) to their normal positions, and during which pin 401 of lever 399 moves from beneath surface 404" of slide 404, permitting said slide to fall so that pin 401 is again positioned in its normal setting relative to notch 402, as shown in FIG. 8.

The vertical total lever 385 with associated parts, including the program modifying control stops 383 (FIG. 9), having thus been restored to normal, along with reopening of switch 386 whereby the vertical total relay 786 is deenergized for releasing all the associated contact elements thereof free of the left side contact engagement and for reengaging with the associated right side contact elements of said relay switches, the machine, following the usual carriage return operation, is now again in condition for the crossfooter type program operations.

*Transfer From Lower to Upper Registers*

It may be that for certain program routines it is desired when taking either a total or a subtotal of a selected one of the electromagnetically controlled registers to transfer an amount stored thereon to one of the registers controlled by the mechanical program control devices for example, the No. 2 register described with reference to FIGS. 2, 4. It is recalled that the No. 2 register is of the crossfooter type, in that both add and subtract control cams 121, 122, respectively are provided on the shaft for this register. Thus, as heretofore known, it is possible to transfer a total thereto by programming cam 121 for cooperation with an operation of plate 419 in manner to engage the No. 2 register for a return stroke of the actuators 610, whereby the transfer amount may be accumulated therein. However, in any given column it may occur that the perforations in program tube 82 as required for a crossfooter program control will not accord with the particular perforations required for the vertical total transfer in that column. Also, it is recalled that for subtotal operations cam plate 419 remains inoperative. Therefore special means must be provided, as disclosed herein, and which are adapted to effect such a transfer during either a total or a subtotal operation of any selected register, as in the manner now to be described.

In the instant example the selection and operation of any register for which either a total or a subtotal character of operation is desired is effected in identical manner to that as set forth in respect to the foregoing description and need not therefore be repeated here.

Let it be assumed, for example, that in lieu of a vertical total operation of register No. 7, as in the final operation for the previously described routine, that it is desired to retain the amount (25.00) stored in said register and at the same time to transfer such amount to the No. 2 register. The operation is thus now a vertical subtotal operation for register No. 7, and slide 734 (FIG. 4) with plate 419 remains inoperative so that said register will remain in active engagement throughout a forward and return stroke of the related actuator racks 710 as in usual manner for subtotal operations.

For the present example a circuit from the closed contacts 866 of the vertical total relay 786 extends over an alternative lead line 867 (indicated for convenience by dotted lines on the diagram FIG. 1A) to one side of a normally open switch member, forming part of the transfer relay 815, and identified by the numeral 2. The opposite side of said switch has circuit lead connection 868 with one side of a rotary solenoid 869, having the opposite side thereof connected to plus line 784. As shown in FIG. 4, solenoid 869 has link connection 870 with a downwardly extending arm of a bell crank lever 871 pivotally mounted at 872 to the subframe 859. Bell crank 871 has also link connection 873 with a rearwardly extending lever 874, loosely mounted upon support shaft 421 for the cam plates 419. As in the manner earlier set forth, the pin 822 (FIG. 1A) at the end of the forward stroke of the machine cycle incident to the present subtotal operation engages the contact switch 820 for momentarily energizing the transfer relay 815. Energizing of relay 815 will effect momentary closure of the contact switches thereof including the switch indicated by the numeral 2. Closure of the latter said switch acts to energize rotary solenoid 869 and thereby to cause a counterclockwise movement thereto, as viewed in FIG. 4. During said movement of solenoid 869 arm 874, through link 873, bell crank 871 and link 870, is caused to be rocked upwardly about pivot 421. As shown in FIG. 5 arm 874 is provided with a cam surface 874' engaging the shaft 403 for the No. 2 register and during the above movement said cam surface will displace support shaft 403 to bring the No. 2 register accumulator wheels into engagement with the actuator racks 610 prior to any return movement of said racks. In order to maintain the register in engagement with racks 610 throughout their return operation there is provided a bell crank lever 875 pivotally mounted to the machine subframing at 876. Said bell crank lever is provided with a notched end 877 on one arm thereof and with a laterally extending projection 878 (FIG. 4) terminating the other arm thereof. Bell crank 875 is normally held in clockwise direction, against the tension of a suitable spring 879, by engagement of projection 878 with the cam lever 318 on rock shaft 301. Immediately upon the start of a machine cycle of operation lever 318 is moved away from projection 878 and bell crank 875 is now limited against counterclockwise movement by engagement thereof with the rearward edge of a lug 880 (FIG. 5) on the cam lever 874. In the above described operation of lever 874 by the electromagnet 869, lug 880 is carried upwardly and the notched end 877 of bell crank 875 thereupon moves into engagement with lug 880 to hold lever 874 in raised condition. Thus cam 874' will continue to hold the No. 2 register in active set condition although solenoid 869, as above set forth, has immediately deenergized. Following a return stroke of the actuators 610 cam levers 318, reengaging projection 878, restores bell crank 875 clockwise to release thereby notched end 877 from lug 880, whereupon cam lever 874 and the associated parts are restored by means of a suitable spring 881 (FIG. 4). Restoration of lever 874 thereupon releases the No. 2 register from engagement with the actuator racks 610 and the parts are now again at their normal condition of rest. Thus a subtotal operation relative to register No. 7 has been completed and any amount as stored therein will in the present example be transferred to appear also within the No. 2 register for subsequent use.

So that the machine may readily effect programs other than the particular program above set forth the flanged carriage tabulating control bar 1 (FIG. 7), the program tube 82 and the flanged control bar 196 are all adapted to be independently indexed to other control position by means of suitable thumb knobs in the well-known manner set forth in the patents of reference. Also, as shown in FIG. 1 the control switch 773 may be manually adjusted to other selective positions A or B, whereby to select other complete control circuits.

In Conclusion

Applicant's novel devices provide for certain program arrangements not heretofore attainable in that amounts accumulated in selected registers are to be transferred to other selected registers while being retained in the original register for subsequent use. This is illustrated in one instance with respect to the "Balance" column of the history card where the balance (18.00) stored in the No. 1 register is to be retained therein while being printed and transferred to another register No. 8 as a subtotal transfer operation. Thus the amount (18.00) by being retained in the No. 1 register is available for a subsequent merging therewith of an overdraft total transferred to said register from the No. 5 register with respect to the "Total Purchases" column. Thereby any amount which may be past due is automatically obtainable and will be printed thereafter in a totalizing operation for said register in an appropriate "Amount Past Due" column. Also said amount (18.00) having now been stored in the No. 8 register is available for later transfer to the No. 7 register during a vertical total series of operations and thus in accumulation with transfers thereto from other selected registers is utilized to provide a check as to a correct original entry made with respect to the old balance.

While there have been shown and pointed out the fundamental novel features of the invention as applied to a preferred embodiment thereof, it will be understood that various omissions, substitutions, and changes in the form and details of the devices illustrated and in their operations may be made by those skilled in the art, without departing from the spirit as indicated by the scope of the claims appended hereto.

I claim:

1. In a machine of the class described having a plurality of crossfooter registers each provided with both add and subtract control devices, a plurality of vertical total registers each having add control devices, reciprocatory actuators therefor, and cyclic operating means; the combination therewith of means for taking totals from any of said registers and for transferring such totals to selective ones of said vertical total registers including universal means cooperable with said control devices in effecting selection of any register for a totalizing operation and in selection of a vertical total register for receiving amounts transferred in said totalizing operations, means settable by the total taking means for effecting an excursion of said universal means by the said cyclic operating means following a value adjustment of the actuators incident to a totalizing operation of a selected register, and wherein during said excursion the said universal means moves free of cooperation with all the said control devices and thereby releases any selected register from actuator engagement, selective holding means for each of said registers, and selective control means for operating selected ones of said holding means whereby to hold any selected transfer registers in engagement with the actuators during said excursion of the universal means, whereby said actuators upon a subsequent return from a value adjustment will act to transfer said value to any selected ones of the said vertical total registers.

2. In a machine of the class described having a plurality of crossfooter registers provided with both add and subtract control devices displaceable with the respective support shafts thereof, a plurality of vertical total registers having add control devices displaceable with the respective support shafts thereof, reciprocatory actuators therefor, and cyclic operating means; the combination therewith of means for taking totals from any selected one of said registers and for transferring such totals to selected ones of said vertical total registers including universal means cooperable with said control devices in effecting selection of any register for a totalizing operation and in selection of a vertical total register for receiving amounts transferred in said totalizing operations, means settable by the total taking means for effecting an excursion of said universal means by the said cyclic operating means following a value adjustment of the actuators incident to a totalizing operation of a selected register, and wherein during said excursion the said universal means moves free of cooperation with the add control devices and thereby releases any add selected registers from actuator engagement, holding means associated with the support shaft for each of the said add registers, and selective control devices for operating selected ones of said holding means whereby to hold any selected ones of the transfer registers in engagement with the actuators during said excursion of the universal means so that said actuators upon subsequent return from a value adjustment incident to a totalizing operation with respect to any selected register will transfer the totalized value to selected ones of the add registers.

3. The invention according to claim 2 and wherein the said add and subtract control cams are mounted on the support shafts for the crossfooter registers and said add control cams only are mounted on the support shafts for the vertical total registers.

4. In a machine of the class described having a plurality of crossfooter registers provided with add-subtract control devices on the respective support shafts thereof, a plurality of vertical total registers having add control devices only on the respective support shafts thereof, reciprocatory actuators therefor, and cyclic operating means; the combination therewith of means for taking totals from any said registers and for transferring such totals to selective ones of said vertical total registers including universal means cooperable with said control devices in effecting selection of any register for a totalizing operation and in selection of a vertical total register for receiving amounts transferred in said totalizing operations, means settable by the total taking means for effecting an excursion of said universal means by the said cyclic operating means following a value adjustment of the actuators incident to a totalizing operation of a selected register, and wherein during said excursion the said universal means moves free of cooperation with the add control devices and thereby releases any add selected registers from actuator engagement, holding coils associated with the support shaft for each of the said add registers, and control circuits for energizing selective ones of said holding coils whereby to magnetically hold any selected ones of the transfer registers in engagement with the actuators during said excursion of the universal means, so that said actuators upon subsequent return from a value adjustment incident to a totalizing operation with respect to any selected register will transfer the totalized value to selected ones of the add registers.

5. The invention according to claim 1 and including a plurality of electromagnets for adjusting related ones of said register control devices whereby to engage an associated register with the said actuators, selective control circuits for energizing a selected one of said electromagnets for effecting engagement of a selected register with the actuators for a totalizing operation thereof, selective control circuits for energizing selective ones of said magnets for effecting engagement of selected registers to receive a total transfer, and in which the latter said control circuits include a relay having open contacts corresponding to related ones of said electromagnets, a control circuit for said relay, means for activating said relay to close the contacts thereof and thereby engage selective ones of said transfer registers with the actuators prior to return movement of a totalized value adjustment of said actuators, and whereby in the related subsequent return movement of said actuators the totalized value setting thereof will be transferred to said selected ones of said transfer registers.

6. In a machine of the class described the combination of a totalizer including add-subtract control elements displaceable with the support shaft therefor, a totalizer with add control elements only displaceable with the support shaft therefor, reciprocatory actuators and cyclic operating devices for said totalizers, universal means normally cooperable with the respective control elements on both the said totalizer shafts to effect a totalizer selection, means for effecting an excursion of said universal means by the cyclic operating devices, means for adjusting the first said control elements and thereby engage the first said totalizer with the actuators prior to an operation of said actuators, means for subsequently adjusting the add control members for engaging the second said totalizer with the actuators prior to a return operation thereof, total taking devices including control means for effecting a displacement of the universal means free of cooperation with the said control elements whereby to effect a release of both the said totalizers free of said actuators, and means operable by the cyclic devices at the end of a forward stroke of the actuator movement for locking the said second totalizer in engaged condition with the actuators whereby an amount totalized from the first said register is caused to be transferred to the second said register upon the return stroke movement of said actuators.

7. In a machine of the class described having a plurality of totalizers, support shafts for each said totalizer including control elements displaceable with said shafts settable for determining selection and character of operation of a totalizer, reciprocatory actuators for said totalizers, cyclic operating means, universal means adapted for excursion in an operation of the cyclic operating means to effect selective cooperation with actively set ones of said control elements, total taking devices including control means settable in total taking operations to effect an excursion of said universal means subsequent to a forward stroke operation of said actuators; in combination therewith a totalizer having a support shaft equipped with add control elements only, electromagnetic means for adjusting the said add control elements to active control condition, control means for said electromagnetic means including a normally open switch in the circuit therefor, means operable following forward stroke movement of the actuators to effect closure of said switch whereby the electromagnetic means acts to adjust said add elements in cooperation with the universal means to engage the latter said totalizer with the actuators, and in which the subsequent operation of said universal means is adapted to release any active set totalizers from said actuators, and a holding means selectively effective for maintaining the second said totalizer engaged for an additive operation thereof during a return stroke of the actuators so that an amount totalized from a selected first totalizer is caused to be transferred to the latter said totalizer.

8. In a machine of the class described having a plurality of value registers, add-subtract control elements on the support shafts for certain ones of said registers, only add control elements on the support shafts for other ones of said registers, reciprocatory actuators for the registers, cyclic operating devices, means adapted to be reciprocated by the cyclic operating devices and provided with elements cooperable with the register shaft control elements in determining a selection and character of operation of said registers, means for taking totals from any selected register and including means settable for controlling a first stroke movement of the said reciprocating means to occur between a forward and return stroke movement of the reciprocatory actuators; the combination therewith of an electromagnet associated with each of the add registers and selectively energized for adjusting the corresponding add control elements on the register shaft whereby to act in cooperation with the reciprocating means to effect a register selection, selective control circuits for said electromagnets including a relay switch provided with normally open contacts in corresponding selective control circuits, a control circuit for said relay including a normally open switch, means operable by the cyclic operating devices to effect a closure of said relay control switch following a forward stroke movement for the actuators, and wherein said relay thereupon is activated for closing the normally open contacts thereof and extend circuits from any selected active ones of said contacts to energize the corresponding electromagnets whereby to operate therewith the related add control elements into active cooperation with the said universal means and thereby selectively engage any corresponding totalizer with the said actuators, and in which return stroke movement of the actuators from value displacement thereof as set during a totalizing operation with respect to a selected one of the value registers will thereupon transfer said value to any said selected active ones of the add registers.

9. In a machine of the class described having crossfooter registers provided with add-subtract control cams on the respective support shafts, vertical total registers provided with add control cams only on the respective support shafts; the combination of reciprocatory value actuators for said registers, cyclic operating devices, means universal to said control cams and cooperable therewith for effecting register selections, total taking means including control devices settable for effecting an excursion of said universal means in a subsequent related movement of the cyclic operating devices following a value adjustment of said actuators incident to a total taking operation, and wherein during said excursion the universal means is adapted to move free of cooperative relation with the said add control cams for releasing related registers from said actuators; means for transferring amounts totalized from any selected one of the registers to selected ones of the said vertical total registers and including related electromagnets energized selectively for operating the corresponding add control cams for effecting a register selection, a relay provided with normally open contacts in corresponding circuits for each of said electromagnets, a control circuit for said relay including a normally open switch, means operable in an operation of the cyclic devices to effect a closure of said switch following said value adjustment of the actuators, and in which said relay when energized closes all the contacts thereof, selective control circuits for said electromagnets including a related one of said relay contacts in series therewith, and wherein closure of said relay contacts will extend any active ones of said control circuits for operating the corresponding electromagnet and related add cams therewith, whereby to displace an associated vertical total register into engagement with the said actuators, related holding coils in juxtaposition to be contacted by said displaced register shafts and adapted to magnetically hold any said displaced vertical total register in said engagement with the actuators during said excursion of the said universal means, and selective control circuits for said holding coils.

10. The invention according to claim 9 with a shiftable record carriage, and wherein said selective control circuits include normally open contact elements adapted to be engaged in accordance with selective columnar positions of said record carriage.

11. The invention according to claim 10 and mechanical control means for a first plurality of said registers including means adapted for selectively determining selection and character of operation of the latter said registers under control of the said shiftable record carriage in a program series of operations, a second plurality of registers electromagnetically controlled for selection in accordance with selective operation of the latter said contacts during said program of operations, and by which amounts totalized from selective ones of said second plurality of registers may be transferred to selective ones of said first plurality of registers or vice versa during said program series of operations.

12. The invention according to claim 8 and including a secondary control means for effecting engagement of a selected one of said first plurality of registers with the said actuators independently of the mechanical program control means, an electromagnet for effecting an operation of said secondary control means, a control circuit for said electromagnet including a normally open switch operable by the record carriage in a selective columnar position, and normally open contacts of said relay in series circuit therewith to the said electromagnet whereby energizing of said relay will cause said electromagnet to operate said secondary control means whereby to engage a selected one of the mechanical control registers with the actuators for receiving a transfer amount from any selected ones of the electromagnetically controlled registers.

13. The invention according to claim 12 and a mechanical latching means for the said secondary control means adapted for holding said selected one of said registers in engagement with said actuators during a transfer movement thereof and means operable by the cyclic operating devices for releasing said latch following a completion of said transfer movement.

14. In a machine of the class described, having a plurality of add-subtract totalizers, actuators therefor, and cyclic operating means, said machine capable of performing cycles of operation in which a totalizer is selected and conditioned for adding or subtracting functions, total taking devices including means for controlling subtotal operations of any selected ones of said totalizers; the combination therewith of means for transferring amounts to other selected totalizers during a subtotaling operation of a selected totalizer and including electromagnets adapted for effecting a selection of a related one of the totalizers to receive a subtotal transfer, control circuits for said electromagnets including a relay member having a normally open contact in the respective control circuits for selected ones of said totalizers, normally open switch members in series circuit with corresponding ones of said relay contacts, means for determining operation of selective ones of said switch members, a control circuit for said relays including a normally open switch in said control circuit, and means operable by the cyclic operating means for closing said switch to effect operation of said relay for closing all the said contacts thereof following a value adjustment of the actuators in a subtotaling operation of any selected totalizer, and wherein circuit from any active selected ones of said switches is extended thereby to energize selected ones of said electromagnets for thereafter engaging any related totalizer with the actuators for the return movement thereof, and whereby said value adjustment is caused to be entered within the latter said register.

15. In a machine of the class described having a plurality of add-subtract totalizers, including support shafts for each of said totalizers, totalizer actuators and cyclic operating devices, said machine capable of performing cycles of operation in which selected ones of said totalizers are conditioned for adding and/or subtracting functions, the combination of add-subtract control cams on certain ones of the support shafts, add cams only on certain other ones of said support shafts, reciprocatory means provided with control surfaces for universal cooperation with said control cams, a control magnet for each of said add control cams, selective control circuits for energizing a selected one of said electromagnets for operating the corresponding cams for engaging a first selected totalizer with the actuators prior to an operation thereof, total and subtotal taking devices including means for displacing said actuators in accordance with amounts stored upon any said selected totalizer, means under control of the total taking devices for effecting an excursion of said reciprocatory means subsequent to a related value adjustment of the actuators and adapted for displacing the said control surfaces thereof free of the said add control cams and whereby the actuators will return freely of the totalizing means under control of the subtotal taking devices for preventing said excursion, a relay provided with a plurality of normally open contacts each in series with a related selective one of said electromagnets, a control circuit for said relay including a normally open switch, means operable by the cyclic operating devices for effecting closure of said switch following said displacement of the actuators and thereby energize said relay for effecting closure of the contacts thereof whereby to energize selected ones of said electromagnets and so engage any corresponding totalizer with the actuators prior to return operation thereof, and in which amounts subtotaled for any first selected totalizer are thus caused to be entered within any latter said totalizers during the related subsequent return operation of said actuators.

16. In a machine of the class described the combination having crossfooter totalizers including add-subtract control cams on the respective support shafts therefor, reciprocatory actuators and cyclic operating devices, said machine capable of performing cycles of operation in which selected ones of said totalizers are conditioned for adding and/or subtracting functions, vertical total totalizers having add cams only on the respective support shafts therefor, electromagnetic means for operating related ones of said cams whereby to engage any selected totalizer with said actuators prior to an operation thereof, and totalizing devices including means for controlling subtotal operations of a selected totalizer; means adapted to effect selection of a vertical total totalizer and whereby a subtotal value is transferred thereto from the first said selected register, comprising selective control circuits for energizing any selected ones of said electromagnets, a normally open relay contact in series with selected ones of said circuits, a control circuit for said relay, and means operable by the cyclic operating devices to activate said relay subsequent to a subtotal value setting of the said actuators but prior to any return movement of the said actuators by the cyclic operating devices incident to said subtotal operation.

17. In a machine of the class described the combination of a plurality of add-subtract totalizers, actuators therefor, printing means and cyclic operating devices, said machine capable of performing cycles of operation in which selected ones of said totalizers are conditioned for adding and/or subtracting functions and for printing of amounts entered upon said totalizers, electromagnets selectively energized for effecting totalizer selections, total taking devices, means adapted in a total taking operation for a first selected totalizer for converting during a plurality of related control operations of said cyclic operating means complemental amounts stored upon said selected totalizer to a true negative value stored thereon, and means for transferring a complemental amount from said first selected totalizer to a second selected totalizer in a first of said cycles of operation.

18. The invention according to claim 14 and a control circuit for said second selected totalizer including a normally closed switch, control means operable by the said cyclic operating means in said first cycle operation thereof for opening said switch, a latch held normally inactive of said control means, means adapted in total taking operations for releasing said latch for cooperation with said control means, whereby to maintain said switch in open circuit condition for disabling the said second totalizer during any subsequent cycles of operation required in converting a complemental to a true negative amount upon the first selected totalizer.

19. In a machine of the class described the combination of a first totalizer, means for taking totals and/or subtotals therefrom, overdraft control devices including means for effecting a plurality of successive machine cycles in operating said first totalizer for a negative totalizing operation thereof whereby to translate complemental value totals appearing on said first totalizer to a true negative total registration thereon; a second totalizer, means controlling selection of said second totalizer in manner whereby complemental amounts stored upon said first totalizer are transferred to the said second register in a first cycle of said negative totalizing operation for said first totalizer and means for thereafter disabling said selection control means for said second totalizer whereby to render said second totalizer inactive during the said subsequent successive overdraft machine cycles of operation relative to said first totalizer.

20. In a machine of the class described the combination of a first totalizer, means for taking totals and/or subtotals therefrom, overdraft control devices including means for effecting a plurality of successive machine cycles during a negative totalizing operation thereof whereby to convert any complemental total on said first totalizer to a true negative value registration; a second totalizer, means including an electromagnet for selecting said second totalizer for operation, means for transferring complemental values appearing upon said first totalizer to the said second totalizer during a first machine cycle of a negative totalizing operation and including a control circuit for said magnet having both a normally closed and a normally open switch in series common therewith, means operable in a first machine cycle of overdraft operation for closing said normally open switch whereby to energize said electromagnet for effecting a selection of said second totalizer for operation during said first machine cycle of an overdraft totalizing operation, means operable during said first machine cycle for opening both the said switches and deenergizing said electromagnet, and means under control of the said means for taking totals/subtotals for holding the latter switch in open condition and thereby render said control circuit inactive of a selection of said second totalizer during the said successive machine cycles of overdraft operation.

21. In a machine of the class described the combination of a plurality of totalizers, actuators therefor, printing means associated therewith, cyclic operating devices, said machine capable of performing cycles of operation in which selected ones of said totalizers are conditioned for adding and/or subtracting functions, means for taking totals and subtotals, overdraft control devices determining a plurality of operations of said cyclic operating means whereby to convert complemental values to be printed as a true negative value, electromagnets adapted to be energized selectively for effecting engagement of any corresponding totalizer with the said actuators, related control circuits for energizing any selected one of said electromagnets prior to an operation of said actuators, selective control circuits for energizing a selected one of said electromagnets following a complemental value adjustment of said actuators relative to an overdraft total/subtotal operation with respect to said first selected totalizer and including a relay provided with normally open contacts in corresponding ones of the latter said control circuits, a control circuit for said relay including a normally closed switch, a normally open switch in series with the latter said switch, means for automatically closing said normally open switch for energizing said relay to close the contacts thereof whereby to energize selected ones of said electromagnets for engaging a corresponding selected totalizer prior to a return movement of the actuators from such complemental value adjustment, and in which said actuators during a return movement thereof in the first said overdraft machine cycle of operation enters the said complemental value upon any latter said selected totalizers, means under control of the total taking means for holding said switch open, and means controlled by the overdraft control devices for releasing said holding means in a final one of said machine cycles relative to the overdraft operations.

22. In a business machine or the like having crossfooter registers including add-subtract control devices on the respective support shafts thereof, vertical total registers including merely add control devices on the respective support shafts thereof, actuators therefor, cyclic operating means, universal means cooperable with said control devices, electromagnets selectively energized for operating a corresponding one of said control devices for cooperation with said universal means whereby to engage any selected register with said actuators, means for imparting reciprocatory operations to said universal means in the operations of said cyclic operating means, means for taking totals and/or subtotals for any selected ones of said registers, overdraft control devices for converting complemental values on any selected one of said registers to a true negative amount in a plurality of successive related operations of said cyclic operating means, a first control circuit including related switches for selectively energizing corresponding ones of said electromagnets for determining selection of any register to be totalized, means for transferring totals and/or subtotals including parallel circuits from selected ones of said switches to selected ones of said electromagnets, normally open relay contacts in the corresponding latter said circuits, a control circuit for said relay including a normally open switch and a normally closed switch in series circuit therewith, means operable in a first cycle of overdraft totalizing operations to effect closure of the first said switch whereby to energize said relay for closing all the contacts thereof and energize any selected ones of said electromagnets for selecting a transfer register, means for thereafter opening the second said switch for disabling said relay for subsequent ones of said overdraft cycles of operations, and means operable in a final cycle of said overdraft operations for reclosing the second said switch subsequent to a reopening of the first said switch during said final cycle.

23. The invention according to claim 22 and wherein the universal means is displaceable free of the register shaft control devices during each of said overdraft control cycles of operation, magnetic holding coils in juxtaposition to related ones of the register shafts whereby to be contacted in an engagement of any corresponding register with the actuators, control circuits for said holding coils selected in parallel with the related selected transfer register circuit, and wherein any active one of said holding coils will act to magnetically hold the related active transfer register in engagement with said actuators during a displacement of said universal means during the transfer of a complemental total thereon in a restore operation of the actuators incident to a first cycle of th overdraft conversion operation.

24. The invention according to claim 23 including means operable by the cyclic operating means in the first conversion cycle to open the said normally closed switch, means under control of the total taking devices for latching said switch in open condition whereby to disable the transfer register during the subsequent overdraft conversion cycles of said operating means, and means under control of the overdraft control devices for releasing said latch at the completion of the final conversion cycle of operation.

25. The invention according to claim 24 and including mechanical latching means for holding a related selected register in engagement with the actuators, a normally closed contact in the respective control circuits for each of the register selection magnets, and wherein said latches in moving to a latching condition will open the related said contact for deenergizing any corresponding active one of said selection magnets, restoring means for said latches including a restoring magnet, a control circuit for said magnet including a relay provided with a plurality of normally closed contacts and a plurality of normally open contacts opposed thereto, the said open contacts each connected in common with a lead to said restoring magnet and said normally closed contacts connected each in series with the corresponding selective circuits for the said holding coils, a control circuit for said relay in parallel with the respective circuit for any selected transfer register and wherein upon activation of any selected transfer circuit both the corresponding holding coil circuit and said relay will be activated, and wherein said relay thereupon opens the holding coil circuits and closes the restore magnet circuit whereby to disable the said mechanical latch means, a normally closed switch in series circuit with said relay, means adapted upon initial movement of the cyclic operating means to open said switch for restoring said relay whereby to free the mechanical latches while energizing any selected active ones of the holding coils, and wherein any said active holding coils will magnetically hold the related selected register in active engagement with the actuators throughout a first return movement of said actuators relative to an overdraft conversion operation while the universal means is free of the said control devices on the respective register shafts during the said reciprocatory movement thereof.

References Cited in the file of this patent

UNITED STATES PATENTS 2,714,985 Saxby et al. _____ Nov. 13, 1952

FOREIGN PATENTS 681,027 Great Britain _____ Oct. 15, 1952

UNITED STATES PATENT OFFICE
CERTIFICATE OF CORRECTION

Patent No. 3,092,312                                            June 4, 1963

James W. Dodsworth

It is hereby certified that error appears in the above numbered patent requiring correction and that the said Letters Patent should read as corrected below.

Column 2, lines 63 and 67, for "take", each occurrence, read -- taken --; column 4, line 65, for "position" read -- positions --; column 5, line 13, strike out "the"; line 24, after "are" insert -- of --; column 6, line 20, strike out "to"; column 7, line 21, for "whiffletress being" read -- whiffletrees --; column 9, line 34, strike out "and", first occurrence; line 72, for "an" read -- and --; column 15, line 24, for "giving" read -- given --; column 17, line 4, for "realting" read -- relating --; line 16, for "conditions" read -- condition --; column 18, line 4, after "that" insert -- the --; column 22, line 43, for "amount" read -- amounts --; column 26, line 22, strike out "of", second occurrence; column 29, line 22, for "springs" read -- spring --; column 31, line 62, for "hence" read -- thence --; column 33, line 70, for "position" read -- positions --; column 38, line 39, for "relays" read -- relay --; column 41, line 46, for "th" read -- the --.

Signed and sealed this 31st day of December 1963.

(SEAL)
Attest:
ERNEST W. SWIDER

Attesting Officer

EDWIN L. REYNOLDS
                                                                    Acting Commissioner of
                                                                          Patents